US012306572B2

(12) United States Patent
Kawaguchi et al.

(10) Patent No.: US 12,306,572 B2
(45) **Date of Patent: *May 20, 2025**

(54) PROCESS CARTRIDGE

(71) Applicant: CANON KABUSHIKI KAISHA, Tokyo (JP)

(72) Inventors: Shintaro Kawaguchi, Kanagawa (JP); Masamichi Sato, Shizuoka (JP); Masatake Tanaka, Kanagawa (JP); Ryo Sugiyama, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 715 days.

This patent is subject to a terminal disclaimer.

(21) Appl. No.: 17/473,819

(22) Filed: Sep. 13, 2021

(65) Prior Publication Data

US 2022/0100145 A1 Mar. 31, 2022

(30) Foreign Application Priority Data

Sep. 28, 2020 (JP) ................................ 2020-162165

(51) Int. Cl.

| | |
|---|---|
| ***G03G 15/08*** | (2006.01) |
| ***G03G 9/08*** | (2006.01) |
| ***G03G 9/097*** | (2006.01) |
| ***G03G 21/18*** | (2006.01) |

(52) U.S. Cl.

CPC ....... *G03G 21/1814* (2013.01); *G03G 9/0819* (2013.01); *G03G 9/0825* (2013.01); *G03G 9/09725* (2013.01); *G03G 15/0812* (2013.01)

(58) Field of Classification Search

None

See application file for complete search history.

(56) References Cited

U.S. PATENT DOCUMENTS

| | | | | |
|---|---|---|---|---|
| 10,895,824 | B2 * | 1/2021 | Sugiyama .......... | G03G 15/0818 |
| 2004/0202495 | A1 | 10/2004 | Koike | |
| 2015/0185658 | A1 | 7/2015 | Wakabayashi | |

(Continued)

FOREIGN PATENT DOCUMENTS

| | | | |
|---|---|---|---|
| CN | 107065468 | A | 8/2017 |
| CN | 110780560 | A | 2/2020 |
| EP | 3719580 | A1 | 10/2020 |

(Continued)

*Primary Examiner* — Peter L Vajda

*Assistant Examiner* — Charles Collins Sullivan, IV

(74) *Attorney, Agent, or Firm* — Canon U.S.A., Inc. IP Division

(57) ABSTRACT

A process cartridge includes a toner, a regulating member, and a developing roller including a conductive substrate, an elastic layer, and a surface layer which includes a binder resin, a first resin particle having an elastic coefficient of 100 to 10,000 MPa, and a second resin particle having an elastic coefficient of 2 to 50 MPa and in which the outer surface has a first protruded portion and a second protruded portion 5.0 μm or more lower than the first protruded portion and has an average maximum height of 6 to 18 μm. The toner includes a toner particle and an external additive A that is a silica particle having a major diameter of 40 to 400 nm, a surface coverage of the toner particle by the external additive A is 3.0% or more, and a dispersion degree evaluation index D of the external additive A is 2.0 or less.

6 Claims, 2 Drawing Sheets

(56) References Cited

U.S. PATENT DOCUMENTS

2017/0219945 A1* 8/2017 Matsui .................. G03G 9/083

FOREIGN PATENT DOCUMENTS

| | | | |
|---|---|---|---|
| JP | 2004126234 | A | 4/2004 |
| JP | 2007171666 | A | 7/2007 |
| JP | 2008292830 | A | 12/2008 |
| JP | 2009237042 | A | 10/2009 |
| JP | 2011154278 | A | 8/2011 |
| JP | 2014092555 | A | 5/2014 |
| JP | 2015143838 | A | 8/2015 |
| JP | 2016102905 | A | 6/2016 |
| JP | 2020095080 | A | 6/2020 |

* cited by examiner

PROCESS CARTRIDGE

BACKGROUND OF THE DISCLOSURE

Field of the Disclosure

The present disclosure relates to a process cartridge.

Description of the Related Art

In an electrophotographic image forming apparatus (hereafter also referred to as an "electrophotographic apparatus", an electrophotographic photosensitive member serving as an image bearing member is charged by a charging device, and an electrostatic latent image is formed by a laser. Subsequently, a toner in a developer container is applied to a developing member by a toner supplying roller and a toner regulating member, and development with a toner is performed due to contact or approach between the image bearing member and the developing member. Thereafter, the toner on the image bearing member is transferred to recording paper by a transfer device and is fixed by heat and pressure, and the toner remaining on the image bearing member is removed by a cleaning member.

Such an electrophotographic apparatus is required to have higher image quality and endurance and a higher printing speed than ever. Consequently, an electrophotographic member and the toner are required to have higher performance.

Further, in recent years, electrophotographic apparatuses have been used in various regions and have also been used in a severe, high temperature, and high humidity environment which particularly aggravates toner deterioration and member pollution. An electrophotographic member or a toner that stably maintains high image quality and endurance even in such a severe environment is desired.

Japanese Patent Laid-Open No. 2009-237042 discloses a developing roller including an acrylic particle and a urethane particle having a smaller average particle diameter than the acrylic particle in the surface layer of the developing roller for the purpose of suppressing a toner from melt-adhering to the developing roller. Regarding the developing roller disclosed in Japanese Patent Laid-Open No. 2009-237042, it is intended to suppress the toner from melt-adhering to the developing roller by reducing stress that results from rubbing between the developing roller and the toner regulating member and that is applied to the toner on the developing roller.

Japanese Patent Laid-Open No. 2007-171666 proposes a method in which an inorganic fine particle having a large particle diameter of about several hundred nanometers, in particular, a sol-gel-method silica particle having a narrow particle size distribution, is added. According to this, a so-called spacer effect is generated, a developing roller, a regulating member, and the like are suppressed from coming into direct contact with a toner, and stress is reduced. Consequently, damage to the toner is reduced and a long operating life of the toner is realized.

As a result of research by the present inventors, it was found that the above-described instances have a horizontal streak problem when a process cartridge (hereafter also referred to as a "cartridge") is left to stand for a long time during use in a high temperature, high-humidity environment.

The cause of horizontal streaks being generated when a cartridge is left to stand for a long time during use is conjectured to be as described below. Toner accumulation occurs between the developing roller and the regulating member when the operation is stopped. At this time, if the amount of the toner that accumulates between the developing roller and the regulating member is large, the toner takes on a state of being crushed by a pressure between the regulating member and the developing roller. If the toner in this state is left to stand for a long time in a high temperature, high-humidity environment, the toner becomes a cohesion cluster due to, for example, bleed from the interior of the toner and melt-adhere to the developing roller and the regulating member. If the operation of the cartridge in this state is started, since the toner is not applied in the longitudinal direction in which the cohesion cluster melt-adheres, a horizontal white streak is generated.

SUMMARY

The present disclosure provides a process cartridge capable of producing a high quality image even when a speed is increased, even when an operating life is increased, and even after being left to stand for a long time during use of the process cartridge in a high temperature, high-humidity environment.

To address the above-described problems, the present inventors performed intensive research. As a result, it was found that the above-described problems are addressed by using a process cartridge including a developing roller and a toner described below.

A process cartridge attachable to and detachable from an electrophotographic apparatus main body includes a toner, a developing roller, and a regulating member, wherein the developing roller includes a conductive substrate, an elastic layer on the conductive substrate, and a surface layer on the elastic layer, the surface layer includes a binder resin, a first resin particle, and a second resin particle, the surface layer has an outer surface having a first protruded portion and a second protruded portion that is present in a region not including the first protruded portion and that has a height 5.0 μm or more smaller than the height of the first protruded portion, the first protruded portion is derived from the first resin particle, the second protruded portion is derived from the second resin particle, the first resin particle has an elastic coefficient of 100 MPa or more and 10,000 MPa or less, the elastic coefficient of the first resin particle being measured at the cross section of the surface layer in the thickness direction, the second resin particle has an elastic coefficient of 2 MPa or more and 50 MPa or less, the elastic coefficient of the second resin particle being measured at the cross section of the surface layer in the thickness direction, the outer surface has an average value of the maximum height Rz of 6 μm or more and 18 μm or less, the toner includes a toner particle and an external additive A dispersed on a surface of the toner particle and covering the surface of the toner particle, the external additive A is a silica particle having a major diameter of 40 nm or more and 400 nm or less, a surface coverage of the toner particle by the external additive A is 3.0% or more, and a dispersion degree evaluation index D of the external additive A is 2.0 or less.

Further features of the present disclosure will become apparent from the following description of exemplary embodiments with reference to the attached drawings.

DESCRIPTION OF THE EMBODIMENTS

Figure 1:
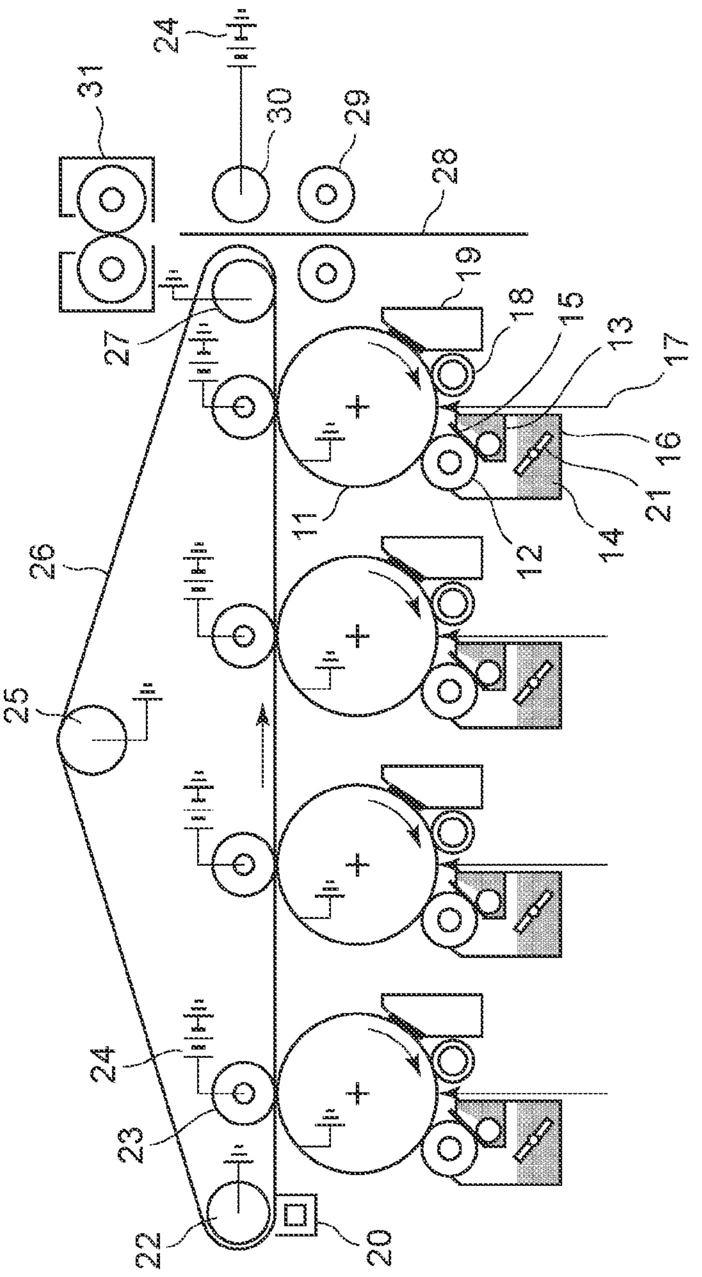
FIG. 1 is a schematic diagram illustrating an example of an electrophotographic image forming apparatus according to the present disclosure.

The present disclosure will be described below in detail.

The present disclosure relates to a process cartridge attachable to and detachable from an electrophotographic apparatus main body. The process cartridge includes a toner, a developing roller, and a regulating member, wherein the developing roller includes a conductive substrate, an elastic layer on the conductive substrate, and a surface layer on the elastic layer, the surface layer includes a binder resin, a first resin particle, and a second resin particle, the outer surface of the surface layer has a first protruded portion and a second protruded portion that is present in a region not including the first protruded portion and that has a height 5.0 μm or more smaller than the height of the first protruded portion, the first protruded portion is derived from the first resin particle, the second protruded portion is derived from the second resin particle, the elastic coefficient of the first resin particle measured at the cross section of the surface layer in the thickness direction is 100 MPa or more and 10,000 MPa or less, the elastic coefficient of the second resin particle measured at the cross section of the surface layer in the thickness direction is 2 MPa or more and 50 MPa or less, the outer surface has an average value of the maximum height Rz of 6 μm or more and 18 μm or less, the toner includes a toner particle and an external additive A, the external additive A is a silica particle having a major diameter of 40 nm or more and 400 nm or less, the surface coverage of the toner particle by the external additive A is 3.0% or more, and the dispersion degree evaluation index D of the external additive A is 2.0 or less.

The cause of horizontal streaks being generated when a cartridge is left to stand for a long time during use is conjectured to be as described below. Toner accumulation occurs between the developing roller and the regulating member when the operation is stopped. At this time, if the amount of the toner that accumulates between the developing roller and the regulating member is large, the toner takes on a state of being crushed by a pressure between the regulating member and the developing roller. If the toner in this state is left to stand for a long time in a high temperature, high-humidity environment, the toner becomes a cohesion cluster due to, for example, bleed from the interior of the toner and melt-adhere to the developing roller and the regulating member. If the operation of the cartridge in this state is started, since the toner is not applied in the longitudinal direction in which the cohesion cluster melt-adheres, a horizontal white streak is generated.

On the other hand, in the present disclosure, it is conjectured that the above-described problems are addressed in accordance with the mechanism described below. It is conjectured that since the first resin particle has an elastic coefficient of 100 MPa or more and 10,000 MPa or less and therefore has high hardness, when the operation of the cartridge is stopped, a force to push out the toner that accumulates between the developing roller and the regulating member is generated. If the elastic coefficient is less than 100 MPa, the hardness is insufficient, and the first resin particle is readily deformed by the pressure from the regulating member so that the pushing force is reduced. If the elastic coefficient is more than 10,000 MPa, since a damage to the toner increases, it is difficult to exert the effect of the present disclosure throughout the endurance period. The average elastic coefficient E1 described later is more preferably 100 MPa or more and 7,500 MPa or less, and E1 is further preferably 100 MPa or more and 2,000 MPa or less. In the present disclosure, since the difference in the height between the protruded portion derived from the first resin particle and the protruded portion derived from the second resin particle is 5 μm or more, the first resin particle having high hardness can effectively transfer the pushing force to the toner. If the difference is less than 5 μm, since the toner is larger than the first resin particle, the pushing force is reduced. In addition, the protruded portion being low and the second resin particle corresponding to a portion into which the toner is introduced on the developing roller having an elastic coefficient of 2.0 MPa or more and 50 MPa or less and being flexible allows the toner to further sink relative to the first resin particle due to a pressure from the regulating member. Consequently, the pushing force of the first resin particle is more readily transferred to the toner. If the elastic coefficient is less than 2.0 MPa, it is difficult to exert the effect of the present disclosure throughout the endurance period, and if the elastic coefficient is more than 50 MPa, since the degree of sinking due to a pressure from the regulating member is low, the pushing force of the first resin particle is not effectively transferred to the toner. The average value of the maximum height Rz is a parameter that represents the height and the frequency of higher protruded portions of a plurality of protruded portions present on the outer surface. The average value of Rz being 6 μm or more and 18 μm or less enables the first protruded portion present on the outer surface to have a height and a frequency sufficient for sticking the head out of the toner layer applied to the developing roller so as to push out. If the average value of Rz is less than 6 μm, the height and the frequency are insufficient for pushing out, and if the average value of Rz is more than 18 μm, since the frequency of particle having high hardness is high, it is difficult to exert the effect of the present disclosure throughout the latter half of the endurance period due to a damage to the toner. The average value of Rz is more preferably 8 μm or more and 16 μm or less.

The dispersion degree evaluation index D of a large particle diameter external additive that is contained in the toner and that has a major diameter of 40 nm or more and 400 nm or less is controlled to be 2.0 or less. Consequently, the spacer effect of the large particle diameter external additive enables the toner to be suppressed from deforming due to a pressure between the developing roller and the regulating member, and the pushing force of the first resin particle is more readily transferred to the toner. Since the dispersion degree evaluation index D being within the above-described range enables an adhesion-reducing effect due to the large particle diameter external additive to be more effectively exerted, accumulation of the toner between the developing roller and the regulating member is eliminated. The dispersion degree evaluation index D of the external additive A is more preferably 0.5 or more and 1.20 or less. If the major diameter of the external additive A is less than 40 nm, since the spacer effect is low, the toner is not suppressed from deforming due to a pressure between the developing roller and the regulating member, and the adhesion-reducing effect is low. If the major diameter is more than 400 nm, it is difficult to control the dispersion degree evaluation index D to be within the range according to the present disclosure. An average major diameter Da described later is more preferably 40 nm or more and 300 nm or less. If the dispersion degree evaluation index is more than 2.0, since maldistribution of the external additive A on the toner surface is considerable, the toner is not suppressed from deforming due to a pressure between the developing roller and the regulating member, and the adhesion-reducing effect is low. The dispersion degree evaluation index is more preferably 0.5 or more and 1.2 or less. Since the dispersion degree evaluation index being 0.5 or more reduces entangling of toners with each other due to the external additive A, the toner is readily disentangled by the pushing force of the first resin particle, and toner accumulation due to stop of the operation of the cartridge does not readily occur. The dispersion degree of the external additive A may be controlled by the amount of the external additive A added and the external addition condition. The surface coverage of the toner particle by the external additive A is 3.0% or more. If the surface coverage is less than 3.0%, the effect of the present disclosure is not exerted from the viewpoint of suppressing the toner from deforming due to a pressure between the developing roller and the regulating member and reducing the adhesion. The surface coverage is more preferably 5.0% or more and 30% or less. The surface coverage can be 30% or less since the dispersion degree is readily controlled to be within the range according to the present disclosure, and the effect of the present disclosure is more readily exerted. The surface coverage of the external additive A may be controlled by the major diameter of the external additive A and the amount of the external additive A added.

The toner according to the present disclosure can contain a silica particle serving as an external additive B and having a major diameter of 5 nm or more and less than 40 nm, where the coverage of the toner particle by the external additive B is 62% or more and 100% or less. The coverage being 62% or more improves the toner flowability, the toner is readily disentangled by the pushing force of the first resin particle, and toner accumulation due to stop of the operation of the cartridge does not readily occur. The coverage of the toner surface by the external additive B may be controlled by the amount of the external additive B added and the external addition condition.

The total adhesion percentage of the external additive A and the external additive B of the toner according to the present disclosure is preferably 70% or more. Since the total adhesion percentage being 70% or more enables the toner flowability to be maintained in the latter half of the endurance period, the effect of the present disclosure is readily exerted throughout the latter half of the endurance period. The total adhesion percentage of the external additive A and the external additive B may be controlled by the amount of the external additive A and the external additive B added and the external addition condition.

In the present disclosure, a volume average diameter D1 of the first resin particle, a volume average diameter D2 of the second resin particle, and a volume average diameter Dt of the toner can satisfy the relationship represented by Formula (a) below.

$$(D1-D2)-Dt>0 \quad (a)$$

Since the relationship represented by Formula (a) is satisfied, the first resin particle is higher than the surface of the toner applied to the second resin particle, and the pushing force of the first resin particle having high hardness is more readily transferred to the toner.

The volume average diameter D2 of the second resin particle and an average major diameter Da of the external additive A can satisfy the relationship represented by Formula (b) below.

$$D2/Da\leq 40 \quad (b)$$

Since the relationship represented by Formula (b) being satisfied enables the external additive A to enter gaps between the second resin particle and enables the toner to be readily disentangled, the effect of the present disclosure is more favorably exerted.

The embodiment according to the present disclosure will be described below in detail.

The developing roller according to the present embodiment will be described below in detail.

Developing Roller

Figure 2:
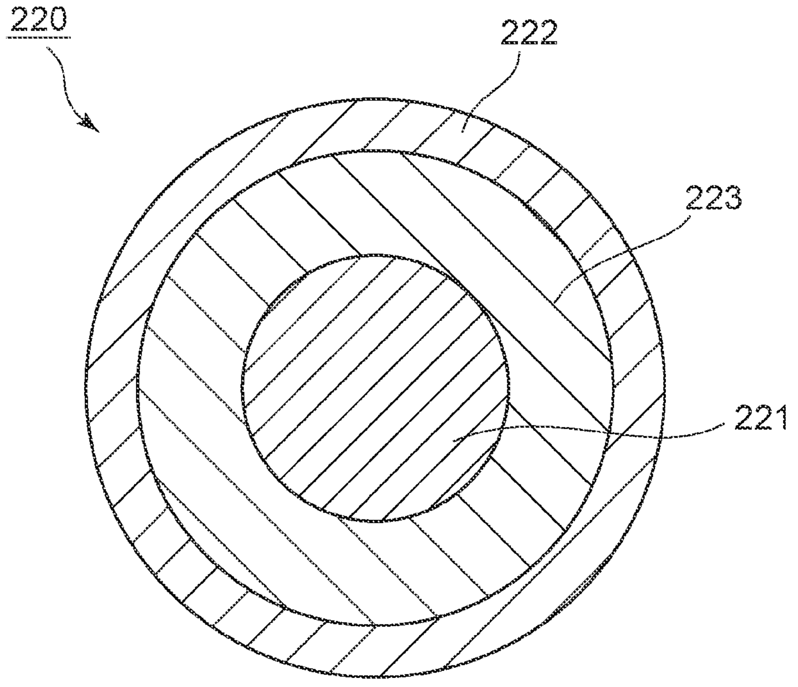
FIG. 2 is a schematic diagram illustrating an example of a developing roller according to an embodiment of the subject disclosure.

As illustrated in FIG. 2 that is a schematic sectional view in a direction perpendicular to the shaft direction, the developing roller 220 according to the present embodiment includes a conductive substrate 221, a conductive elastic layer 223 on the conductive substrate, and a surface layer 222 on the conductive elastic layer. The conductive elastic layer 223 may have at least one layer, as the situation demands. The surface layer 222 is a single layer.

Conductive Substrate

The conductive substrate has a function of supporting the conductive elastic layer disposed thereon and the surface layer. Examples of the material of the conductive substrate include metals such as iron, copper, aluminum, and nickel; and alloys containing these metals, such as stainless steel, duralumin, brass, and bronze. These may be used alone, or at least two types may be used in combination. For the purpose of providing scratch resistance, the substrate surface may be subjected to plating treatment within the bound of not impairing the conductivity. Further, a substrate in which the surface is provided with conductivity by coating the surface of a resin base material with a metal or a substrate produced from a conductive resin composition may be used.

Conductive Elastic Layer

The conductive elastic layer may be either a solid body or a foam. The conductive elastic layer may be composed of a single layer or a plurality of layers. The elastic coefficient of the conductive elastic layer is preferably 0.5 MPa ($0.5\times10^6$ Pa) or more and 10 MPa ($10\times10^6$ Pa) or less. Examples of the material of such a conductive elastic layer include natural rubber, isoprene rubber, styrene rubber, butyl rubber, butadiene rubber, fluororubber, urethane rubber, and silicone rubber. These may be used alone, or at least two types may be used in combination. Of these, silicone rubber can be used due to having a low elastic coefficient.

The conductive elastic layer may contain conducting agents, non-conductive fillers, and other various additive components required for forming, such as crosslinking agents, catalysts, and dispersion promoters, in accordance with the function required of the developing roller. Regarding the conducting agents, various conductive metals or alloys thereof, conductive metal oxides, fine powders of insulating materials coated with these, electron conducting agents, ionic conducting agents, and the like may be used. These conducting agents in a powder or fiber form may be used alone, or at least two types may be used in combination. Of these, carbon black serving as an electron conducting agent can be used due to ease of controlling conductivity and economy. Examples of the non-conductive fillers include diatomaceous earth, quartz powder, dry silica, wet silica, titanium oxide, zinc oxide, aluminosilicate, calcium carbonate, zirconium silicate, aluminum silicate, talc, alumina, and iron oxide. These may be used alone, or at least two types may be used in combination.

The volume resistivity of the conductive elastic layer is preferably $1.0\times10^4$ to $1.0\times10^{10}$ Ω·cm. The volume resistivity of the conductive elastic layer being within this range readily suppresses variations in the development field from occurring. The volume resistivity is more preferably $1.0\times10^4$ to $1.0\times10^9$ Ω·cm. The volume resistivity of the conductive elastic layer may be controlled by the content of the conducting agent in the conductive elastic layer.

The thickness of the conductive elastic layer is preferably 0.1 mm or more and 50.0 mm or less and more preferably 0.5 mm or more and 10.0 mm or less.

Examples of the method for forming the conductive elastic layer include a method in which the conductive elastic layer is formed on the substrate through heat-hardening with an appropriate temperature and time by using various forming methods such as extrusion molding, press molding, injection molding, liquid injection molding, and cast molding. For example, a conductive elastic layer is precisely formed on the substrate outer circumference by injecting unhardened material for forming the conductive elastic layer into a cylindrical die in which the substrate is placed and performing heat hardening.

Surface Layer

The outer surface of the surface layer has a first protruded portion and a second protruded portion that is present in a region not including the first protruded portion and that has a height 5.0 μm or more smaller than the height of the first protruded portion. The first protruded portion is derived from the first resin particle, and the second protruded portion is derived from the second resin particle. The elastic coefficient of the first resin particle measured at the cross section of the surface layer in the thickness direction is 100 MPa or more and 10,000 MPa or less. The elastic coefficient of the second resin particle measured at the cross section of the surface layer in the thickness direction is 2 MPa or more and 50 MPa or less. The outer surface has an average value of the maximum height Rz of 6 μm or more and 18 μm or less.

The peak vertex density SpD is preferably $5.0\times10^3$ ($1/mm^2$) or more and $5.0\times10^4$ ($1/mm^2$) or less.

To control the conductivity of the surface layer, the conducting agent may be mixed into the surface layer. An additive, for example, a surfactant may be mixed to control the mold releasability of the toner.

Further, the outer surface vicinity of the surface layer can have high hardness since the effect of pushing out the toner by the first resin particle is enhanced.

The layer thickness of the surface layer is preferably 4 μm or more and 100 μm or less. The layer thickness is a thickness at a portion provided with neither the first protruded portion nor the second protruded portion. The thickness may include a first resin particle that do not form a first protruded portion or a second resin particle that do not form a second protruded portion. When the layer thickness is set to be 4 μm or more, the first protruded portion and the second protruded portion derived from the first resin particle and the second resin particle, respectively, are readily formed, and the average value of Rz and SpD are readily set to be within the above-described ranges. The layer thickness can be set to be 4 μm or more since an influence of the elastic coefficient Eb of the surface layer matrix is dominant even when the hardness of the outer surface vicinity of the surface layer is increased, and flexible deformation of the surface layer readily occurs. The layer thickness can be set to be 100 μm or less since flexible deformation of the surface layer readily occurs. The layer thickness is more preferably 6 μm or more and 30 μm or less.

Surface Layer Matrix

The surface layer matrix can contain a polyurethane as a binder. A crosslinked urethane resin is suitable for the binder due to excellent flexibility and strength.

The polyurethane is obtained from a polyol, an isocyanate, and, as the situation demands, a chain extender. Examples of the polyol serving as the material for forming the polyurethane include polyether polyols, polyester polyols, polycarbonate polyols, polyolefin polyols, and acrylic polyols and mixtures of these. Examples of the isocyanate serving as the material for forming the polyurethane include tolylene diisocyanate (TDI), diphenylmethane diisocyanate (MDI), naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethylxylylene diisocyanate (TMXDI), and cyclohexane diisocyanate and mixtures of these. Examples of the chain extender include difunctional low-molecular-weight diols such as ethylene glycol, 1,4-butanediol, and 3-methylpentanediol, trifunctional low-molecular-weight triols such as trimethylolpropane, and mixtures of these. Alternatively, prepolymer-type isocyanate compounds that have an isocyanate group at a terminal and that are obtained by reacting, in advance, the above-described various isocyanate compounds with the above-described various polyols in a state of excessive amount of isocyanate groups may be used. Regarding the isocyanate compounds, materials produced by blocking the isocyanate group with various blocking agents such as an MEK oxime may be used.

The polyurethane may be obtained by reacting the polyol with the isocyanate through heating irrespective of the materials used. In this regard, when one of or both the polyol and the isocyanate have a branch structure and at least three functional groups, the resulting polyurethane is a cross-linked polyurethane.

The elastic coefficient Eb at the depth of 1 μm or more from the outer surface of the matrix, which is measured by using a method described later, is preferably 10 MPa or more and 100 MPa or less. When the elastic coefficient Eb is set to be 10 MPa or more, the effect of pushing out the toner by the first resin particle is readily exerted, where the first protruded portion is formed by coating the first resin particle. The elastic coefficient Eb being set to be 100 MPa or less enables the region in which the second resin particle is present to be flexibly deformed with the second resin particle. Consequently, the toner further sinks relative to the first resin particle due to a pressure from the regulating member, and the pushing force of the first resin particle can be more readily transferred to the toner.

The elastic coefficient Eb of the surface layer matrix is adjusted to be within the above-described range by the molecular structure of the resin, the interaction due to addition of fine particles such as silica or carbon black, and the like.

First Protruded Portion and Second Protruded Portion

The outer surface of the surface layer has the first protruded portion and the second protruded portion that is present in a region not including the first protruded portion and that has a height 5.0 μm or more smaller than the height of the first protruded portion. The first protruded portion is derived from the first resin particle described below, and the second protruded portion is derived from the second resin particle described below. Two protruded portions that are present on the outer surface of the surface layer and that have a height difference of 5.0 μm or more are identified by using a method described later, and the elastic coefficients of the particles constituting the two protruded portions are measured by using a method described below. As a result, presence of the first protruded portion and the second protruded portion on the outer surface of the surface layer is identified.

Average Value of Maximum Height Rz

The average value of the maximum height Rz of the outer surface of the surface layer is 6 μm or more and 18 μm or less. The average value of the maximum height Rz is a numerical value determined by a measuring method described below, is an average value of a plurality of maximum heights Rz, and therefore is a parameter capable of representing the height and the frequency of higher protruded portions of a plurality of protruded portions present on the outer surface. In the present disclosure, since the first protruded portion is higher than the second protruded portion, the average value of Rz has a strong correlation with the height and the frequency of the first protruded portion. The average value of Rz being set to be 6 μm or more and 18 μm or less enables the first protruded portion present on the outer surface to have a height and a frequency sufficient for sticking the head out of the toner layer applied to the developing roller so as to push out. If the average value of Rz is less than 6 μm, the height and the frequency are insufficient for pushing out, and if the average value of Rz is more than 18 μm, since the frequency of the particle having high hardness is high, it is difficult to exert the effect of the present disclosure throughout the latter half of the endurance period due to a damage to the toner. The average value of Rz is more preferably 6 μm or more and 18 μm or less.

As described above, the average value of Rz has a strong correlation with the height and the frequency of the first protruded portion and therefore is adjusted mainly by the volume average particle diameter and the mixing amount of the raw material for forming the first resin particle. In addition, the sticking state of the first resin particle is also changed by the volume average particle diameter and the mixing amount of the raw material for forming the second resin particle and the layer thickness of the surface layer, and the average value of Rz is also adjusted. In this regard, the volume average particle diameter of the raw material resin particle is a median diameter based on a "laser diffraction-scattering method" by using a particle size distribution analyzer, as illustrated in the example described later.

Peak Vertex Density SpD

The peak vertex density SpD of the outer surface of the surface layer that is measured by the method described later is preferably $5.0\times10^3$ ($1/mm^2$) or more and $5.0\times10^4$ ($1/mm^2$) or less. The peak vertex density SpD is a parameter expressing the number of protruded portions present in a unit area and has a strong correlation with the frequency of small protruded portion when a plurality of protruded portions are present. Therefore, SpD has a strong correlation with the frequency of the second protruded portion. SpD being set to be $5.0\times10^3$ ($1/mm^2$) or more, that is, many second protruded portions being present enables the pushing force of the first resin particle to be effectively transferred to the toner due to sinking of the second resin particle. SpD being set to be $5.0\times10^4$ ($1/mm^2$) or less enables the effect of the present disclosure to be readily exerted since a portion of the second resin particles into which the toner is introduced is not excessive relative to the first resin particle that pushes out the toner.

SpD according to the present disclosure may be adjusted by the volume average particle diameter and the mixing amount of the first resin particle below and the second resin particle below. Of these, SpD is adjusted mainly by the volume average particle diameter and the mixing amount of the second resin particle since SpD has a strong correlation with the frequency of the relatively small second protruded portion, as described above.

First Resin Particle

The first resin particle having an elastic coefficient of 100 MPa or more and 10,000 MPa or less and having high hardness generates a force for pushing out the toner that accumulates between the developing roller and the regulating member. If the elastic coefficient is less than 100 MPa, the hardness is insufficient, and the first resin particle is readily deformed by the pressure from the regulating member so that the pushing force is reduced. If the elastic coefficient is more than 10,000 MPa, since a damage to the toner increases, it is difficult to exert the effect of the present disclosure throughout the endurance period. The average elastic coefficient E1 described later is more preferably 100 MPa or more and 7,500 MPa or less, and E1 is further preferably 100 MPa or more and 2,000 MPa or less. The elastic coefficient of the first resin particle is adjusted to be within the above-described range by the molecular structure of the resin, the degree of cross-linkage, and the like.

Examples of the material of the first resin particle include polyurethanes and acrylic resins. Of these, the resin particle can contain a polyurethane due to excellent strength.

Examples of the polyurethane contained in the first resin particle include ether-based polyurethanes, ester-based polyurethanes, acrylic polyurethanes, polycarbonate-based polyurethanes, and polyolefin-based polyurethanes.

The volume average particle diameter of the first resin particle in the surface layer is preferably 10 μm or more and 20 μm or less. The volume average particle diameter can be set to be 10 μm or more since the first protruded portion derived from the first resin particle readily sticks out of the toner coat layer on the outer surface of the developing roller and a force for pushing out the toner is effectively exerted. A more preferable range is 13 μm or more and 18 μm or less. The volume average particle diameter is a volume average particle diameter of the first resin particle in a state of being contained in the surface layer formed by using the method described later, and the measuring method is also described later.

The content of the first resin particle in the surface layer is preferably 3% by volume or more and 25% by volume or less. When the content is set to be 3% by volume or more, the first protruded portion is readily allowed to be present at a frequency sufficient for pushing out the toner. When the content is set to be 25% by volume or less, since the toner between the developing roller and the regulating member is not readily disturbed at an excessive frequency and the toner is not excessively damaged, the effect of the present disclosure is also readily exerted throughout the latter half of the endurance period.

Second Resin Particle

The elastic coefficient of the second resin particle is 2 MPa or more and 50 MPa or less. If the elastic coefficient is less than 2 MPa, it is difficult to exert the effect of the present disclosure throughout the endurance period, and if the elastic coefficient is more than 50 MPa, since the degree of sinking due to a pressure from the regulating member is low, the pushing force of the first resin particle is not effectively transferred to the toner. The elastic coefficient E2 of the second resin particle is adjusted to be within the above-described range by the molecular structure of the resin, the degree of cross-linkage, and the like.

Examples of the material of the second resin particle include polyurethanes and silicones. Of these, the resin particle can contain a polyurethane due to excellent strength and flexibility.

The volume average particle diameter of the second resin particle in the surface layer is smaller than the volume average particle diameter of the first resin particle in the surface layer. Consequently, the first protruded portion derived from the first resin particle is made to be higher than the second protruded portion derived from the second resin particle. The difference between the volume average particle diameter of the first resin particle and the volume average particle diameter of the second resin particle is preferably 5 μm or more and 15 μm or less. The difference can be set to be 5 μm or more, since the first resin particle sticks out of the toner coat layer and readily push out the toner, where the outer surface of the developing roller is coated with the toner. The difference can be set to be 15 μm or less, since a large amount of toner is suppressed from entering between the developing roller and the regulating member. The volume average particle diameter of the second resin particle is preferably 3 μm or more and 10 μm or less. The volume average particle diameter can be set to be 10 μm or less, since a protrusion height difference sufficient for the first resin particle to push the toner is readily formed. In addition, favorably, the second protruded portions derived from the second resin particles tend to become fine at a high density, the toner readily follow the second protruded portions that sink due to a pressure applied by the regulating member, and a pushing force of the first resin particle is effectively exerted. The volume average particle diameter is more preferably 4 μm or more and 8 μm or less. The volume average particle diameter is a volume average particle diameter of the second resin particle in a state of being contained in the surface layer formed by using the method described later, and the measuring method is also described later.

The content of the second resin particle in the surface layer is preferably 15% by volume or more and 50% by volume or less. The content can be set to be 15% by volume or more, since the second protruded portions derived from the second resin particles tend to become fine at a high density and sink due to a pressure applied by the regulating member. When the content is set to be 50% by volume or less, a portion of the second resin particles into which the toner is introduced is not excessive relative to the first resin particle that push out the toner, and the effect of the present disclosure is readily exerted.

Conducting Agent

To control the conductivity of the surface layer, the conducting agent may be mixed into the surface layer. Examples of the conducting agent mixed into the surface layer include electron conducting agents such as ionic conducting agents and carbon black. Of these, carbon black can be used since the conductivity of the surface layer and the toner chargeability of the surface layer are controllable. The volume resistivity of the surface layer is preferably within the range of $1.0\times10^3$ Ω·cm to $1.0\times10^{11}$ Ω·cm.

Additive

The surface layer may contain various additives within the bound of not impairing the features of the present disclosure. For example, inorganic compound fine particles such as silica being mixed into the surface layer enable the surface layer to be provided with reinforcements and enables the elastic coefficient Eb of the binder resin to be adjusted. To improve the performance, such as improvement of toner releasability and reduction in a dynamic friction coefficient, required of the developing roller, organic-compound-based additives such as silicone oil may be mixed into the surface layer.

Method for Forming Surface Layer

There is no particular limitation regarding the method for forming the surface layer, and forming may be performed by using, for example, the following method. A surface-layer-forming coating liquid containing the binder resin, the first resin particle, and the second resin particle and, as the situation demands, the conducting agent and the additives is prepared. A substrate or a substrate provided with the conductive elastic layer and the like is dipped into the coating liquid, and drying is performed so as to form a surface layer on the substrate.

Next, a method for producing a toner base particles according to the present disclosure will be described. The toner base particles may be produced by using a known method, and a kneading-pulverization method or a wet production method may be used. The wet production method can be used from the viewpoint of uniform particle diameter and shape controllability. Examples of the wet production method include a suspension polymerization method, a dissolution suspension method, an emulsion polymerization aggregation method, and an emulsion aggregation method, and an emulsion aggregation method can be used in the present disclosure.

The emulsion aggregation method is as described below. Initially, materials such as fine particles of the binder resin and a colorant are dispersed and mixed in an aqueous medium containing a dispersion stabilizer. A surfactant may be added to the aqueous medium. Subsequently, an aggregating agent is added so as to cause aggregation to have a predetermined toner particle diameter. Thereafter or simultaneously with aggregation, resin fine particles are made to melt-adhere to each other. As the situation demands, shape control due to heat is performed so as to form a toner particle. In this regard, the binder resin fine particle may be a composite particle formed from a multilayer composed of at least two resin layers having different compositions. For example, production may be performed by using an emulsion polymerization method, a mini-emulsion polymerization method, a phase inversion emulsification method, or the like, or production may be performed by combining some methods.

When an internal additive is contained in the toner base particles, the resin fine particle may contain the internal additive, or a dispersion liquid of internal additive fine particle composed of just the internal additive may be separately prepared, and the resulting internal additive fine particle may be aggregated simultaneously with aggregation of the resin fine particle. A toner particle composed of layers having different compositions may be formed by performing aggregation while resin particles having different compositions are added with a time difference during aggregation.

The following materials may be used as the dispersion stabilizer. Examples of inorganic dispersion stabilizers include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina.

Examples of the organic dispersion stabilizers include polyvinyl alcohols, gelatin, methyl cellulose, methylhydroxypropyl cellulose, ethyl cellulose, carboxymethyl cellulose sodium salts, and starch.

Known cationic surfactants, anionic surfactants, and nonionic surfactants may be used as the surfactant. Specific examples of the cationic surfactant include dodecylammonium bromide, dodecyltrimethylammonium bromide, dodecylpyridinium chloride, dodecylpyridinium bromide, and hexadecyltrimethylammonium bromide. Specific examples of the nonionic surfactant include dodecyl polyoxyethylene ether, hexadecyl polyoxyethylene ether, nonylphenyl polyoxyethylene ether, lauryl polyoxyethylene ether, sorbitan monooleate polyoxyethylene ether, styrylphenyl polyoxyethylene ether, and monodecanoyl sucrose. Specific examples of the anionic surfactant include aliphatic soaps such as sodium stearate and sodium laurate, sodium lauryl sulfate, sodium dodecylbenzene sulfate, and sodium polyoxyethylene (2) lauryl ether sulfate.

The binder resin constituting the toner base particles will be described.

Vinyl-based resins, polyester resins, and the like can be examples of the binder resin. The following resins and polymers may be listed as examples of the vinyl-based resins, polyester resins, and other binder resins.

Examples of the binder resin include homopolymers of styrene or substituted product thereof such as polystyrenes and polyvinyltoluenes; styrene-based copolymers such as styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-maleic acid copolymers, and styrene-maleic acid ester copolymers; polymethyl methacrylates, polybutyl methacrylates, polyvinyl acetates, polyethylenes, polypropylenes, polyvinyl butyrals, silicone resins, polyamide resins, epoxy resins, polyacrylic resins, rosin, modified rosin, terpene resins, phenol resins, aliphatic or alicyclic hydrocarbon resins, and aromatic petroleum resins. These binder resins may be used alone or in combination.

The binder resin can contain a carboxy group and be a resin produced by using a polymerizable monomer containing a carboxy group. Examples include vinyl carboxylates such as acrylic acid, methacrylic acid, α-ethyl acrylic acid, and crotonic acid; unsaturated dicarboxylic acids such as fumaric acid, maleic acid, citraconic acid, and itaconic acid; and unsaturated dicarboxylic acid monoester derivatives such as succinic acid monoacryloyloxyethyl ester, succinic acid monomethacryloyloxyethyl ester, phthalic acid monoacryloyloxyethyl ester, and phthalic acid monomethacryloyloxyethyl ester.

Regarding the polyester resin, a material produced by subjecting the carboxylic acid component and the alcohol component, described below, to polycondensation may be used. Examples of the carboxylic acid component include terephthalic acid, isophthalic acid, phthalic acid, fumaric acid, maleic acid, cyclohexane dicarboxylic acid, and trimellitic acid. Examples of the alcohol component include bisphenol A, hydrogenated bisphenols, bisphenol A ethylene oxide adducts, bisphenol A propylene oxide adducts, glycerin, trimethylolpropane, and pentaerythritol.

The polyester resin may be a polyester resin containing a urea group. Regarding the polyester resin, favorably, a carboxy group at a terminal or the like is not capped.

To control the molecular weight of the binder resin constituting the toner base particles, a crosslinking agent may be added during polymerization of the polymerizable monomer.

Examples of the crosslinking agent include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinylbenzene, bis(4-acryloxypolyethoxyphenyl)propane, 1,3-butylene glycol diacrylate, 1,4-butanediol diacrylate, 1,5-pentanediol diacrylate, 1,6-hexanediol diacrylate, tetraethylene glycol diacrylate, diacrylate of each of polyethylene glycol #200, #400, and #600, dipropylene glycol diacrylate, polypropylene glycol diacrylate, and polyester-type diacrylate (produced by MANDA Nippon Kayaku Co., Ltd.) and methacrylates corresponding to the above-described acrylates.

The amount of the crosslinking agent added is preferably 0.001% by mass or more and 15.000% by mass or less relative to the polymerizable monomer.

In the present disclosure, a release agent can be contained as one of the materials constituting the toner base particles. In particular, when an ester wax having a melting point of 60° C. or higher and 90° C. or lower is used, a plasticizing effect is readily obtained since the compatibility with the binder resin is excellent.

Examples of the ester wax used in the present disclosure include waxes primarily containing a fatty acid ester such as carnauba wax and montanic acid ester wax; fatty acid esters in which some of or all the acid components have been deacidified, such as deacidified carnauba wax; methyl ester compounds which are obtained by, for example, hydrogenating vegetable fats and oils and which have a hydroxy group; saturated fatty acid monoesters such as stearyl stearate and behenyl behenate; diesterified products of saturated aliphatic dicarboxylic acids and saturated aliphatic alcohols, such as dibehenyl sebacate, distearyl dodecanedioate, and distearyl octadecanedioate; and diesterified products of saturated aliphatic diols and saturated aliphatic monocarboxylic acids, such as nonanediol dibehenate and dodecanediol distearate.

Of these waxes, bifunctional ester waxes (diesters) having two ester bonds in the molecular structure can be contained.

The bifunctional ester wax is an ester compound of a dihydric alcohol and an aliphatic monocarboxylic acid or an ester compound of a divalent carboxylic acid and an aliphatic monoalcohol.

Specific examples of the aliphatic monocarboxylic acid include myristic acid, palmitic acid, stearic acid, arachidic acid, behenic acid, lignoceric acid, cerotic acid, montanic acid, melissic acid, oleic acid, vaccenic acid, linoleic acid, and linolenic acid.

Specific examples of the aliphatic monoalcohol include myristyl alcohol, cetanol, stearyl alcohol, arachidyl alcohol, behenyl alcohol, tetracosanol, hexacosanol, octacosanol, and triacontanol.

Specific examples of the divalent carboxylic acid include butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), dodecanedioic acid, tridecanedioic acid, tetradecanedioic acid, hexadecanedioic acid, octadecanedioic acid, eicosanedioic acid, phthalic acid, isophthalic acid, and terephthalic acid.

Specific examples of the dihydric alcohol include ethylene glycol, propylene glycol, 1,3-propanediol, 1,4-butanediol, 1,5-pentanediol, 1,6-hexanediol, 1,10-decanediol, 1,12-dodecanediol, 1,14-tetradecanediol, 1,16-hexadecanediol, 1,18-octadecanediol, 1,20-eicosanediol, 1,30-triacontanediol, diethylene glycol, dipropylene glycol, 2,2,4-trimethyl-1,3-pentanediol, neopentyl glycol, 1,4-cyclohexane dimethanol, spiroglycol, 1,4-phenylene glycol, bisphenol A, and hydrogenated bisphenol A.

Examples of the other usable release agent include petroleum-based waxes such as paraffin wax, microcrystalline wax, and petrolatum and derivatives thereof, montanic wax and derivatives thereof, hydrocarbon waxes by using the Fischer-Tropsch method and derivatives thereof, polyolefin waxes such as polyethylene and polypropylene and derivatives thereof, natural waxes such as carnauba wax and candelilla wax and derivatives thereof, higher aliphatic alcohols, and fatty acids such as stearic acid and palmitic acid and compounds thereof. The content of the release agent is preferably 5.0 parts by mass or more and 20.0 parts by mass or less relative to 100.0 parts by mass of the binder resin or the polymerizable monomer.

In the present disclosure, there is no particular limitation regarding a colorant contained in the toner particle, and known materials described below may be used.

Regarding yellow pigments, yellow iron oxide, Naples yellow, naphthol yellow S, Hansa yellow G, Hansa yellow 10G, benzidine yellow G, benzidine yellow GR, quinoline yellow lake, permanent yellow NCG, and condensed azo compounds such as tartrazine lake, isoindolinone compounds, anthraquinone compounds, azo metal complexes, methine compounds, and allylamide compounds are used. Specific materials are as described below.

Specific materials include C.I. Pigment Yellow 12, 13, 14, 15, 17, 62, 74, 83, 93, 94, 95, 109, 110, 111, 128, 129, 147, 155, 168, and 180.

Examples of red pigments include red iron oxide, permanent red 4R, lithol red, pyrazolone red, watching red calcium salt, lake red C, lake red D, brilliant carmine 6B, brilliant carmine 3B, eosin lake, rhodamine lake B, condensed azo compounds such as alizarin lake, diketopyrrolopyrole compounds, anthraquinone compounds, quinacridone compounds, basic dye lake compounds, naphthol compounds, benzimidazolone compounds, thioindigo compounds, and perylene compounds. Specific materials are as described below.

Specific materials include C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

Examples of blue pigments include alkali blue lake, Victoria blue lake, phthalocyanine blue, metal-free phthalocyanine blue, phthalocyanine blue partial chloride, fast sky blue, copper phthalocyanine compounds such as indathrene blue BG and derivatives thereof, anthraquinone compounds, and basic dye lake compounds. Specific materials are as described below.

Specific materials include C.I. Pigment Blue 1, 7, 15, 15:1, 15:2, 15:3, 15:4, 60, 62, and 66.

Examples of black pigments include carbon black and aniline black. These colorants may be used alone, in combination, or in a state of solid solution.

The content of the colorant is preferably 3.0 parts by mass or more and 15.0 parts by mass or less relative to 100.0 parts by mass of the binder resin or the polymerizable monomer.

In the present disclosure, the toner base particles may contain a charge control agent. Regarding the charge control agent, known materials may be used. In particular, a charge control agent having a high charge speed and being capable of stably maintaining the constant amount of electric charge can be used.

Materials that serve as the charge control agents and that provide the toner particle with a property of being negatively charged are as described below.

Examples of the material include organometallic compounds and chelate compounds such as monoazo metal compounds, acetylacetone metal compounds, aromatic oxycarboxylic acids, aromatic dicarboxylic acids, and oxycarboxylic-acid-based and dicarboxylic-acid-based metal compounds. Other examples of the materials include aromatic oxycarboxylic acids, aromatic monocarboxylic acids and aromatic polycarboxylic acids and metal salts, anhydrides, and esters thereof, and phenol derivatives such as bisphenol. Further, urea derivatives, metal-containing salicylic-acid-based compounds, metal-containing naphthoic-acid-based compounds, boron compounds, quaternary ammonium salts, and calixarenes are included.

Meanwhile, examples of the charge control agent that provides the toner particle with a property of being positively charged include nigrosine and nigrosine modified with a fatty acid metal salt or the like; guanidine compounds; imidazole compounds; quaternary ammonium salts such as tributylbenzylammonium-1-hydroxy-4-naphthosulfonate and tetrabutylammonium tetrafluoroborate; onium salts such as phosphonium salts that are analogs of these and lake pigments of these; triphenylmethane dyes and lake pigments of these (lake former is phosphotungstic acid, phosphomolybdic acid, phosphotungstomolybdic acid, tannic acid, lauric acid, gallic acid, ferricyanide, ferrocyanide, and the like); metal salts of higher fatty acids; and resin-based charge control agents.

The charge control agents may be contained alone, or at least two types may be contained in combination. The amount of the charge control agent added is preferably 0.01 parts by mass or more and 10.00 parts by mass or less relative to 100.00 parts by mass of the polymerizable monomer.

Next, the external additive A used in the present disclosure will be described.

There is no particular limitation regarding the method for producing the external additive A used for the present disclosure, and a sol-gel method can be adopted. The method for producing a silica particle by using the sol-gel method will be described below.

Initially, in an organic solvent in which water is present, alkoxysilane is subjected to a hydrolysis and condensation reaction by using a catalyst so as to obtain a silica sol suspension. Subsequently, the solvent is removed from the silica sol suspension and drying is performed so as to obtain a silica fine particle.

The major diameter of a silica particle produced by the sol-gel method is controllable by the reaction temperature, the dripping speed of alkoxysilane, the weight ratio of the water to the organic solvent to the catalyst, and the agitation speed during the hydrolysis and condensation reaction step.

In general, the thus obtained silica particle has hydrophilicity and many surface silanol groups. Consequently, when the silica particle is used as the external additive of the toner, the surface of the silica particle can be subjected to hydrophobic treatment.

Examples of the hydrophobic treatment method include a method in which the solvent is removed from the silica sol suspension, drying is performed, and treatment with a hydrophobic treatment agent is performed and a method in which a hydrophobic treatment agent is directly added to the silica sol suspension and the treatment is performed simultaneously with drying. A method in which a hydrophobic treatment agent is directly added to the silica sol suspension can be adopted from the viewpoint of controlling the half-width in the particle size distribution and controlling the saturation amount of water adsorption.

Examples of the hydrophobization method include a method in which chemical treatment with an organosilicic compound that reacts with or physically adsorbs silica is performed. In a favorable method, silica generated by vapor phase oxidation of a silicon halogen compound is treated with an organosilicic compound.

Such an organosilicic compound is as described below.

Examples of the organosilicic compound include hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, and benzyldimethylchlorosilane.

Examples of the organosilicic compound further include bromomethyldimethylchlorosilane, α-chloroethyltrichlorosilane, β-chloroethyltrichlorosilane, chloromethyldimethylchlorosilane, triorganosilylmercaptan, trimethylsilylmercaptan, and triorganosilyl acrylate.

Examples further include vinyldimethylacetoxysilane, dimethylethoxysilane, dimethyldimethoxysilane, diphenyldiethoxysilane, and 1-hexamethyldisiloxane.

Examples further include 1,3-divinyltetramethyldisiloxane, 1,3-diphenyltetramethyldisiloxane, and dimethylpolysiloxane having 2 to 12 siloxane units per molecule and having one hydroxy group bonded to each Si in a unit located at a terminal.

These may be used alone, or at least two types may be used in combination.

Regarding silicone-oil-treated silica, a silicone oil having a viscosity at 25° C. of preferably 30 $mm^2$ is or more and 1,000 $mm^2/s$ or less is used.

Examples of the silicone oil include dimethylsilicone oils, methylphenylsilicone oils, α-methylstyrene-modified silicone oils, chlorophenylsilicone oils, and fluorine-modified silicone oils.

The methods for silicone oil treatment are as described below.

Examples of the method include a method in which silica treated with a silane coupling agent and a silicone oil are directly mixed by using a mixer such as an FM mixer, a method in which a silicone oil is sprayed to silica serving as a base, and a method in which a silicone oil is dissolved or dispersed into an appropriate solvent, silica is added and mixed, and a solvent is removed.

Regarding the silicone-oil-treated silica, the silica after silicone oil treatment can be heated to a temperature of 200° C. or higher (more preferably 250° C. or higher) in an inert gas so as to stabilize a surface coat.

In addition, to facilitate monodispersion of silica fine particle on the toner particle surface or to exert a stable spacer effect, the silica particle may be produced by pulverization treatment.

The major diameter of the external additive B used for the present disclosure is 5 nm or more and 40 nm or less. The external additive B may be wet silica produced by a precipitation method, a sol-gel method, or the like or dry silica produced by a vaporized metal combustion method, a fuming method, or the like and can be dry silica.

The raw material for forming the dry silica can be a silicon halogen compound or the like.

Silicon tetrachloride is used as the silicon halogen compound. Silanes such as methyltrichlorosilane and trichlorosilane may be used alone as the raw material, or silicon tetrachloride and silanes in a state of mixture may be used as the raw material.

Predetermined silica can be obtained through a so-called flame hydrolysis reaction in which the raw material is vaporized and reacts with water that is generated as an intermediate material in oxyhydrogen flames.

For example, a thermal decomposition and oxidation reaction of a silicon tetrachloride gas in oxygen and hydrogen is exploited, and a reaction formula is as described below.

$$SiCl_4+2H_2+O_2 \rightarrow SiO_2+4HCl$$

The method for producing dry silica will be described below.

Oxygen gas is supplied to a burner, and an ignition burner is ignited. Thereafter, hydrogen gas is supplied to the burner so as to form flames, silicon tetrachloride serving as the raw material is introduced into the flames so as to be gasified. Subsequently, at least a flame hydrolysis reaction is made to occur, and a resulting silica powder is recovered.

The average diameter is adjustable by appropriately changing a flow rate of silicon tetrachloride, a flow rate of oxygen gas supplied, a flow rate of hydrogen gas supplied, and a retention time of silica in flames.

The external additive B can also be subjected to surface treatment akin to the surface treatment of the external additive A.

A method for measuring each of the physical properties according to the present disclosure will be described below.

Average Value of Maximum Height Rz of Developing Roller

The average value of the maximum height Rz according to the present disclosure may be measured by scanning the outer surface of the surface layer of the developing roller with a laser microscope (trade name: VK-X150 produced by KEYENCE CORPORATION).

Initially, the developing roller is disposed so that the peak in the circumference direction of the developing roller outer surface is just under the lens of the laser microscope and so that the shaft direction of the developing roller is in accord with the longitudinal direction in the field of view of laser microscope observation. Subsequently, the shape of the outer surface of the surface layer is measured under the following conditions.

Mode: shape measurement expert

Measurement lens: magnification of ×50

Upper and lower limits in Z-axis: points at which reflected light becomes unobserved in laser field of view Laser brightness: automatic Double scan: always performed Measurement mode: surface shape Measurement size: high definition (2048×1536)

Measurement quality: high precision

RPD: ON

Pitch: 0.13 μm

Next, the above-described measurement results are read by a multi-file analysis application which is software attached to the laser microscope. The read image is corrected in the order described below.

Surface Shape Correction:

Correction method: quadratic surface correction, designation method: region designation Cut Level of Height:

Cut level: strong

Smoothing:

Size: 7×7, Type: simple average

Next, the average value of Rz is calculated under the following conditions.

Measurement mode: "multiple line roughness"

Measurement region: horizontal line

Number of lines in circumference: 18

Interval: skip 20 lines

Measurement value: average value of Rz

The above-described measurement is performed at 30 points in total of 5 evenly spaced points in the developing roller shaft direction×6 evenly spaced points in the circumferential direction, and the arithmetic average value thereof is taken as the average value of the maximum height Rz of the developing roller Z-1. Consequently, the average value of the maximum height Rz according to the present embodiment is the average value of the maximum height Rz of 540 points in total of 18 lines in a short distance×30 points and, accordingly, expresses the height and the frequency of higher protruded portions on the outer surface of the surface layer.

Peak Vertex Density SpD

The peak vertex density SpD is obtained by surface observation under a microscope in the same manner as for the average value of the maximum height Rz. Initially, the shape of the outer surface of the developing roller is measured in the same manner as for the above-described average value of the maximum height Rz.

Subsequently, the above-described measurement results are read by a multi-file analysis application which is software attached to the laser microscope. The read image is corrected in the same manner as for the average value of the maximum height Rz.

Next, SpD is calculated under the following conditions.

Measurement mode: "surface roughness"

Measurement region: entire region

Measurement value: SpD

The above-described measurement is performed at 30 spots in total of 5 evenly spaced spots in the developing roller shaft direction×6 evenly spaced spots in the circumferential direction, and the arithmetic average value thereof per $mm^2$ is taken as the peak vertex density SpD of the developing roller.

Identification of First Protruded Portion and Second Protruded Portion

A difference in the height between the first protruded portion and the second protruded portion on the outer surface of the surface layer of the developing roller is determined by surface observation under a microscope in the same manner as for the above-described average value of the maximum height Rz. Initially, the shape of the outer surface of the developing roller was measured in the same manner as for the above-described average value of the maximum height Rz.

Subsequently, the above-described measurement results are read by a multi-file analysis application which is software attached to the laser microscope. The read image is corrected in the same manner as for the average value of the maximum height Rz.

Next, in the measurement mode: "line roughness", a vertex of a relatively large protruded portion present in the observation field of view is connected to a vertex of a relatively small protruded portion by designating two points, and two protruded portions are extracted where a difference in the height between the vertex of the large protruded portion and the vertex of the small protruded portion is 5.0 μm or more.

The outer surface of the developing roller is marked so that the large protruded portion and the small protruded portion are distinguishable from each other. Subsequently, the developing roller is cooled to −150° C., and a rubber slice is cut by using a cryomicrotome (UC-6 (product name) produced by Leica Microsystems) so that a cross section of the surface layer in the thickness direction appears including vertexes of the two marked protruded portions.

Measurement of Elastic Coefficient of First Resin Particle and Second Resin Particle A scanning probe microscope (SPM) (trade name: MFP-3D-Origin produced by Oxford Instruments) is used for the measurement. Specifically, the rubber slice produced as described above is left to stand in an environment at room temperature of 23° C. and a humidity of 50% for 24 hours. Thereafter, the resulting rubber slice is placed on a silicon wafer, and the silicon wafer is set on a stage of the scanning probe microscope. The cross-sectional portion of the surface layer of the rubber slice is scanned by a probe (AC160 (product name) produced by Olympus Corporation). In this regard, the conditions for the probe are set to be a spring constant: 28.23 nN/nm, an impulse constant: 82.59 nm/V, and a resonance frequency: 282 kHz (first order) and 1.59 MHz (high order). Regarding other measurement conditions, the measurement mode for SPM is set to be the AM-FM mode, the free amplitude of the probe is set to be 3 V, and the amplitudes of the set point are set to be 2 V (first order) and 25 mV (high order). In the size of the field of view of 20 μm×20 μm, the scanning speed is set to be 1 Hz, and the number of scanning points is set to be vertically 256 points and horizontally 256 points.

Thereafter, 10 measurement points in the center vicinity of a resin particle of the rubber slice in the thickness direction of the surface layer are designated, and a force curve is acquired at each measurement point in the contact mode. In this regard, the conditions for acquiring the force curve are as described below. The force curve is acquired under the conditions that a trigger value is 0.2 to 0.5 V (changed in accordance with the hardness), a distance for measuring the force curve is 500 nm, and a scanning speed is 1 Hz (speed at which the probe makes one round trip). Thereafter, each force curve is subjected to fitting based on the Hertz theory. The highest value and the lowest value are removed from the obtained results, and an arithmetic average of the eight points is determined and taken as the elastic coefficient of each measurement region. A particle having an elastic coefficient of 100 MPa or more and 10,000 MPa or less is denoted as the first resin particle, and particle having an elastic coefficient of 2 MPa or more and 50 MPa or less is denoted as the second resin particle.

Regarding each of the first resin particle and the second resin particle, the above-described measurement is performed with respect to 45 or more particles in the total number at 9 or more spots in total of 3 or more evenly spaced spots in the developing roller shaft direction×3 or more evenly spaced spots in the circumferential direction. Subsequently, the arithmetic average value of the first resin particle is taken as the average elastic coefficient E1 of the first resin particle, and the arithmetic average value of the second resin particle is taken as the average elastic coefficient E2 of the second resin particle.

Elastic Coefficient of Surface Layer Matrix

The elastic coefficient Eb of a surface layer matrix is measured as described below.

The elastic coefficient of the surface layer matrix in a region of 1.1 to 1.2 μm, in the depth direction, from the outer surface of the surface layer in the cross section of the surface layer in the thickness direction is measured by using the above-described method.

Next, the elastic coefficients are similarly measured in regions at a pitch of 1.0 μm in the depth direction from the above-described region to the vicinity of the interface to the above-described conductive elastic layer. In this regard, the measurement in the contact mode is performed while avoiding the conductive agent, the filler, and the like. The above-described measurement is performed at 9 spots in total of 3 evenly spaced spots in the developing roller shaft direction×3 evenly spaced spots in the circumferential direction, and the arithmetic average value thereof is taken as the elastic coefficient Eb of the surface layer matrix.

Volume Average Particle Diameters D1 and D2 and Volume Ratio of Resin Particle

The volume average particle diameters D1 and D2 of the resin particles present in the surface layer are measured by using the following method.

All resin particles present in the surface layer cross section used for the measurement of the elastic coefficient are classified into the first resin particle and the second resin particle on the basis of the measurement result of the elastic coefficient, and the circle-equivalent diameter $D_s$ of the cross section of each particle is calculated from the cross-sectional area of each particle. On the assumption that each particle is a sphere and the cross section is a cross section obtained by randomly cutting the sphere, the particle diameter D of the resin particle is calculated from the circle-equivalent diameter $D_s$ of the cross section on the basis of Formula (1) below.

$$D_s = 2\times\int_{-\frac{D}{2}}^{\frac{D}{2}}\sqrt{\left(\frac{D}{2}\right)^2 - x^2}\,dx \tag{1}$$

therefore $$D = 4/\pi\times D_s$$

The above-described measurement is performed with respect to 100 or more particles of each of the first resin particle and the second resin particle in the total number at 9 or more spots in total of 3 or more evenly spaced spots in the developing roller shaft direction×3 or more evenly spaced spots in the circumferential direction. The thus obtained D of each particle and a volume value obtained through conversion by using $4/3\times\pi\times(D/2)^3$ are used so as to calculate the volume average particle diameters (median diameters) D1 and D2 of the first resin particle and the second resin particle, respectively.

It is understood from Table 3, Table 5, and Table 6 that there is a favorable correlation between the volume average particle diameter in the surface layer and the volume average particle diameter of the particle serving as the raw material (also simply referred to as average particle diameter).

In addition, the volume ratios of the first resin particle and the second resin particle in the surface layer are equal to the area ratios obtained from the cross-sectional areas and, therefore, are calculated by using the cross section for the above-described measurement. Specifically, all resin particles present in the surface layer cross section are classified into the first resin particle and the second resin particle on the basis of the elastic coefficient, and the area ratios of the first resin particle and the second resin particle to the cross-sectional area of the surface layer are calculated. This measurement is performed at 9 or more spots in total of 3 or more evenly spaced spots in the developing roller shaft direction×3 or more evenly spaced spots in the circumferential direction, and the arithmetic averages thereof are taken as the volume ratios V1 and V2 of the first resin particle and the second resin particle, respectively.

Measurement of Major Diameters of External Additive A and External Additive B

The surface of a toner particle is imaged by using FE-SEMS-4800 (produced by Hitachi, Ltd.) at a magnification of ×50,000. The major diameter of an external additive is measured by using the enlarged image, and an additive having a major diameter of 40 nm or more and 400 nm or less is denoted as the external additive A. An additive having a major diameter of 5 nm or more and less than 40 nm is denoted as the external additive B. The measurement is performed with respect to 100 particles each of the external additive A and the external additive B, the average value of the major diameters of the external additive A is denoted as the average major diameter Da, and the average value of the major diameters of the external additive B is denoted as the average major diameter db.

The same applies to a toner containing a plurality of types of external additives on the surface of the toner particle. When a reflection electron image observation is performed with S-4800, it is possible to identify elements of each fine particle by using element analysis such as EDAX. In addition, it is possible to select the same type of fine particles on the basis of the feature of the shape and the like. The same type of fine particles being subjected to the above-described measurement enables the major diameter to be calculated on a type of the fine particle basis.

Dispersion Degree Evaluation Index of External Additive a on Toner Surface

Calculation is performed from the observation image used for measuring the major diameters of the external additive A and the external additive B by using image processing software "ImageJ".

Just the external additive particles having a major diameter of 40 nm or more and 400 nm or less are selected on the software, binarization is performed, the number n of the external additive particles and barycentric coordinates of all external additive particles are calculated, and the distance dnmin between each external additive particle and the closest external additive particle is calculated. When the closest distance average value is denoted as dave, the dispersion degree evaluation index is represented by Formula (2) below.

$$\text{dispersion degree evaluation index} = \sqrt{\frac{\sum_1^n (d\,n\,\mathrm{min} - d\,ave)^2}{n}}\Big/ d\,ave \tag{2}$$

Randomly selected 50 toner particles are observed, the dispersion degree evaluation index is determined, and an average value thereof is denoted as the dispersion degree evaluation index.

Coverage by External Additive A and External Additive B

The coverage by the external additive A and the external additive B according to the present disclosure is measured on the basis of the observation image used for determining the major diameters of the external additive A and the external additive B. Calculation on the basis of the observation image is performed by using the image processing software "ImageJ" as described below.

Just particles derived from the external additive A having a major diameter of 40 nm or more and 400 nm or less in the image are selected on the software. Subsequently, the area of the selected screen is displayed by setting of measurement. The resulting value is divided by the area of the entire field of view and is taken as the coverage by the external additive A in the field of view concerned. This measurement is performed with respect to 100 fields of view, and the average value thereof is denoted as the coverage by the external additive A. The coverage by the external additive B is determined in the same manner as for the coverage by the external additive A except that particles derived from the external additive B having a major diameter of 5 nm or more and less than 40 nm in the image are selected on the software.

Method for Measuring Total Adhesion Percentage of External Additive A and External Additive B A concentrated sucrose liquid is prepared by adding 160 g of Sucrose (produced by KISHIDA CHEMICAL Co., Ltd.) to 100 mL of deionized water and warming the resulting liquid in a hot water so as to perform dissolution. A dispersion liquid is produced by placing 31 g of the concentrated sucrose liquid and 6 mL of Contaminon N (10%-by-mass aqueous solution of precision measurement instrument cleaning neutral detergent having a pH of 7 composed of a nonionic surfactant, an anionic surfactant, and an organic builder, produced by Wako Pure Chemical Industries, Ltd.) into a centrifugal separation tube (volume of 50 mL). The resulting dispersion liquid is mixed with 1.0 g of toner, and an aggregate of the toner is disentangled by using a spatula or the like.

The centrifugal separation tube is shaken by using a shaker at 350 spm (strokes per min) for 20 minutes. After shaking, the solution is transferred into a swing rotor glass tube (volume of 50 mL), and separation is performed by using a centrifuge (H-9R produced by KOKUSAN Co., Ltd.) under the conditions of 3,500 rpm and 30 minutes. Sufficient separation of the toner from the solution is visually checked, and the toner separated as an uppermost layer is removed with a spatula or the like. A removed aqueous solution containing the toner is filtered by using a vacuum filter. Thereafter, drying is performed by using a dryer for 1 hour or more. The dried product is pulverized with a spatula, and the amount of silicon is measured with X-ray fluorescence. The adhesion percentage (%) is calculated from the ratio of the amount of measurement target element in the toner after washing to that in the toner at an initial stage.

X-ray fluorescence measurement of each element is performed in conformity with JIS K 0119-1969 and is specifically described below.

Regarding the measuring apparatus, a wavelength dispersive X-ray fluorescence spectrometer "Axios" (produced by PANalytical) and an attached dedicated software "SuperQ ver. 4. OF" (produced by PANalytical) for setting the measurement conditions and analyzing the measurement data are used. In this regard, Rh is used as an anode of an X-ray tube, the measurement atmosphere is set to be a vacuum, the measurement diameter (collimator mask diameter) is set to be 10 mm, and the measurement time is set to be 10 seconds. When a light element is measured, detection is performed by using a proportional counter (PC), and when a heavy element is measured, detection is performed by using a scintillation counter (SC).

Regarding a measurement sample, about 1 g of the toner after washing or the toner at an initial stage is placed into a dedicated press aluminum ring having a diameter of 10 mm and is leveled. A pellet having a thickness of about 2 mm press-molded at 20 MPa for 60 sec by using Tablet Briquetting Press "BRE-32" (produced by MAEKAWA TESTING MACHINE MFG. Co., Ltd.) is used.

The measurement is performed under the above-described conditions, an element is identified on the basis of the position of the obtained X-ray peak, and the concentration of the element is calculated from the counting rate (unit: cps) which is the number of X-ray photons per unit time.

The method for quantifying, for example, silicon in the toner will be described. For example, 0.5 parts by mass of silica ($SiO_2$) fine powder is added to 100 parts by mass of toner particles, and mixing is sufficiently performed by using a coffee mill. Likewise, 2.0 parts by mass or 5.0 parts by mass of the silicon fine powder is mixed with toner particles, and these are used as samples for forming a calibration curve.

Regarding each sample, a sample pellet for forming a calibration curve is produced by using Tablet Briquetting Press, as described above, and the counting rate (unit: cps) of Si—Kα ray observed at a diffraction angle (2θ) of 109.08°, where PET is used as a dispersive crystal, is measured. At this time, the acceleration voltage and the current value of an X-ray generator are set to be 24 kV and 100 mA, respectively. The resulting calibration curve is a linear function, the vertical axis represents the obtained X-ray counting rate, and the horizontal axis represents the amount of $SiO_2$ added to each sample for forming the calibration curve.

An analysis target toner is made into a pellet by using Tablet Briquetting Press, as described above, and the Si—Kα ray counting rate thereof is measured. Subsequently, the content of an organosilicon polymer in the toner is determined on the basis of the calibration curve. The ratio of the amount of an element in the toner after washing to the amount of the element in the toner at an initial stage is determined, the amount being calculated by using the above-described method, and is taken as the adhesion percentage (%).

Measurement of Toner Particle Diameter

An accurate particle size distribution analyzer (trade name: Coulter Counter Multisizer 3) based on an aperture impedance method and dedicated software (trade name: Beckman Coulter Multisizer 3 Version 3.51 produced by Beckman Coulter, Inc.) are used. An aperture diameter used is 100 μm, the measurement is performed with the number of effective measurement channels of 25,000, the measurement data are analyzed, and calculation is performed. Regarding an electrolytic aqueous solution used for the measurement, a solution in which analytical grade sodium chloride is dissolved into deionized water so as to have a concentration of about 1% by mass, for example, ISOTON II (trade name) produced by Beckman Coulter, Inc., is used. Before the measurement and the analysis are performed, the dedicated software is set as described below.

In a "Changing standard operation method (SOM)" screen of the dedicated software, the total count number in the control mode is set to be 50,000 particles, the number of measurements is set to be 1, and a Kd value is set to be a value obtained by using "Standard particle 10.0 μm" (produced by Beckman Coulter, Inc.). A threshold value and a noise level are automatically set by pushing a "Threshold value/noise level measurement button". In addition, Current is set to be 1,600 μA, Gain is set to be 2, Electrolytic solution is set to be ISOTON II (trade name), and "Flush of aperture tube after measurement" is checked.

In a "Setting conversion from pulse to particle diameter" screen of the dedicated software, Bin interval is set to be logarithmic particle diameter, Particle diameter bin is set to be 256 particle diameter bin, and Particle diameter range is set to be 2 μm or more and 60 μm or less.

Specific measuring method is as described below.

(1) A 250 mL round-bottom glass beaker dedicated to Multisizer 3 is charged with about 200 mL of the electrolytic aqueous solution, the beaker is set into a sample stand, and counterclockwise agitation with a stirrer rod is performed at 24 rotations/sec. Subsequently, soiling and air bubbles in an aperture tube are removed by a "Flush of aperture" function of the analysis software.

(2) A 100 mL flat-bottom glass beaker is charged with about 30 mL of the electrolytic aqueous solution. To the beaker, about 0.3 mL of diluted liquid prepared by diluting Contaminon N (trade name) (10% by mass aqueous solution of precision measurement appliance cleaning neutral detergent produced by Wako Pure Chemical Industries, Ltd.) with deionized water by a factor of 3 on a mass basis is added.

(3) A predetermined amount of deionized water and about 2 mL of Contaminon N (trade name) are added to the water tank of an ultrasonic dispersion device (trade name: Ultrasonic Dispersion System Tetora 150 produced by Nikkaki Bios Co., Ltd.) that includes two oscillators having an oscillation frequency of 50 kHz, with their phases shifted by 180° from each other, and that has an electrical output of 120 W.

(4) The beaker according to (2) above is set into a beaker fixing hole of the ultrasonic dispersion device, and the ultrasonic dispersion device is operated. Subsequently, the height position of the beaker is adjusted so that the resonance state of the liquid surface of the electrolytic aqueous solution in the beaker becomes at a maximum level.

(5) In the state in which the electrolytic aqueous solution in the beaker according to (4) above is irradiated with ultrasonic waves, about 10 mg of toner (particles) are added gradually to the electrolytic aqueous solution and are dispersed. Subsequently, the ultrasonic dispersion treatment is continued for further 60 sec. In this regard, during the ultrasonic dispersion, the water temperature of the water tank is appropriately adjusted to become 10° C. or higher and 40° C. or lower.

(6) The electrolytic aqueous solution, according to (5) above, containing dispersed toner (particles) is dripped to the round-bottom beaker, according to (1) above, set into the sample stand by using a pipette so that the measured concentration is adjusted to about 5%. Subsequently, the measurement is performed until the number of measured particles reaches 50,000.

(7) The weight average particle diameter (D4) is calculated by analyzing the measurement data with the dedicated software attached to the apparatus. In this regard, an "Average diameter" on an "Analysis/volume statistical value (arithmetic mean)" screen, where graph/volume % is set in the dedicated software, corresponds to the weight average particle diameter (D4). An "Average diameter" on an "Analysis/number statistical value (arithmetic mean)" screen, where graph/number % is set in the dedicated software, corresponds to the number average particle diameter (D1).

EXAMPLES

The present disclosure will be specifically described below with reference to the examples and the comparative examples. However, the present disclosure is not limited to these examples and the like. All "part" and "%" used in the example and the comparative example are on a mass basis, unless otherwise specified.

Example 1

Production Example of Toner Particle

Production Example of Toner Particle 1

A production example of Toner particle 1 will be described.

Preparation of Binder Resin-Particle Dispersion Liquid

A solution was produced by mixing 89.5 parts of styrene, 9.2 parts of butyl acrylate, 1.3 parts of acrylic acid, and 3.2 parts of n-lauryl mercaptan. An aqueous solution composed of 1.5 parts of NEOGEN RK (produced by Dai-ichi Kogyo Seiyaku Co., Ltd.) and 150 parts of deionized water was added to the resulting solution and was dispersed. An aqueous solution composed of 0.3 parts of potassium persulfate and 10 parts of deionized water was added while slow agitation was further performed for 10 minutes. After replacement with nitrogen was performed, emulsion polymerization was performed at 70° C. for 6 hours. After polymerization was completed, the reaction liquid was cooled to room temperature, and deionized water was added so as to obtain a resin-particle dispersion liquid having a solids concentration of 12.5% by mass and a median diameter of 0.2 μm on a volume basis.

Preparation of Release Agent Dispersion Liquid

A release agent dispersion liquid was obtained by mixing 100 parts of release agent (behenyl behenate, melting point: 72.1° C.) and 15 parts of NEOGEN RK into 385 parts of deionized water and performing dispersion for about 1 hour by using a wet jet mill JN100 (produced by JOKOH CO., LTD.). The concentration of the release agent dispersion liquid was 200% by mass.

Preparation of Colorant Dispersion Liquid

A colorant dispersion liquid was obtained by mixing 100 parts of carbon black "Nipex 35 (produced by Orion Engineered Carbons)" serving as a colorant and 15 parts of NEOGEN RK into 885 parts of deionized water and performing dispersion for about 1 hour by using a wet jet mill JN100.

Preparation of Toner Particle 1

A homogenizer (ULTRA-TLURRAX T50 produced by IKA) was used so as to disperse 265 parts of resin-particle dispersion liquid, 10 parts of wax dispersion liquid, and 10 parts of colorant dispersion liquid. The temperature in the container was adjusted to 30° C. while agitation was performed, and 1 mol/L hydrochloric acid was added so as to adjust the pH to 5.0. An associated particle was generated by starting temperature increase after leaving to stand for 3 minutes and by increasing the temperature to 50° C. In this state, the particle diameter of the associated particle was measured by using Coulter Counter Multisizer 3 (registered trademark, produced by Beckman Coulter, Inc.). When the weight average particle diameter reached 6.8 μm, 1 mol/L sodium hydroxide aqueous solution was added to adjust the pH to 8.0 so as to stop particle growth.

Thereafter, temperature was increased to 95° C. so as to perform melt-adhesion and spheroidization of the associated particle. When the average circularity reached 0.980, temperature decrease was started, and the temperature was decreased to 30° C. so as to obtain Toner-particle dispersion liquid 1.

Hydrochloric acid was added to resulting Toner-particle dispersion liquid 1 so as to adjust the pH to 1.5, agitation was performed for 1 hour, and, after standing, solid-liquid separation was performed by using a pressure filter so as to obtain a toner cake. The resulting cake was subjected to a reslurry operation by using deionized water so as to form a dispersion liquid again. Thereafter, solid-liquid separation was performed by using the above-described pressure filter. The reslurry operation and the solid-liquid separation were repeated until the electric conductivity of the filtrate became 5.0 μS/cm or less, and finally solid-liquid separation was performed so as to obtain a toner cake. The resulting toner cake was dried by using a flash dryer Flash Jet Dryer (produced by SEISHIN ENTERPRISE CO., LTD.). Regarding the conditions for drying, the blowing temperature was 90° C., the dryer outlet temperature was 40° C., and the cake feed rate was adjusted to a rate at which the outlet temperature did not deviate from 40° C. in accordance with the water content of the toner cake. Further, fine powders and coarse powders were cut by using a multi-division classifier which exploited a coanda effect so as to obtain Toner base particles 1.

Production Example of Silica Particle 1

A 3-liter glass reactor provided with an agitator, a dropping funnel, and a thermometer was charged with 589.6 g of methanol, 42.0 g of water, and 47.1 g of 28%-by-mass ammonia water, and mixing was performed. The temperature of the resulting solution was adjusted to 35° C., and addition of 1,100.0 g (7.23 mol) of tetramethoxysilane and 395.2 g of 5.4%-by-mass ammonia water was simultaneously started while agitation was performed. Tetramethoxysilane was dripped over 6 hours, and ammonia water was dripped over 5 hours. After dripping was completed, agitation was further continued for 0.5 hours so as to perform hydrolysis. As a result, a methanol-water dispersion liquid of hydrophilic spherical sol-gel silica fine particle was obtained. Subsequently, an ester adaptor and a cooling tube were attached to the glass reactor, and the above-described dispersion liquid was sufficiently dried at 80° C. under reduced pressure. The above-described steps were performed several tens of times, and the resulting silica particle was subjected to pulverization treatment by using Pulverizer (produced by Hosokawa Micron Corporation).

Thereafter, 500 g of silica particle was charged into a polytetrafluoroethylene inner cylinder-type stainless steel autoclave having an internal volume of 1,000 ml. After the interior of the autoclave was replaced with nitrogen gas, 0.5 g of hexamethylenedisilazane (HMDS) and 0.1 g of water were made to take on a foggy state by using a two-fluid nozzle so as to be uniformly blown to the silica powder while an agitation blade attached to the autoclave was rotated at 400 rpm. After agitation was performed for 30 minutes, the autoclave was hermetically sealed, and heating was performed at 200° C. for 2 hours. Subsequently, ammonia was removed by decompressing the interior of the system while heating was performed so as to obtain Silica particle 1.

Production Example of Silica Particle 9

Hydrophobic treatment was applied to 100 parts of dry silica fine powder (BET specific surface area of 300 $m^2/g$) by using 30 parts of dimethylsilicone oil.

Production Example of Toner 1

In Mixing step 1, Toner particle 1 and Silica particle 1 were mixed by using FM mixer (Model FM10C produced by NIPPON COKE & ENGINEERING CO., LTD.).

In the state in which the water temperature in the jacket in FM mixer was stabilized at 25° C.±1° C., 100 parts of Toner particle 1 and 0.75 parts of Silica particle 1 were placed into the mixer. Mixing was started at the rotational speed of the rotation impeller of 400 rpm, and mixing was performed for 2 minutes while the water temperature and the flow rate in the jacket were controlled to stabilize the temperature in the tank at 25° C.±1° C. so that a mixture of Toner particle 1 and Silica particle 1 was obtained.

In Mixing step 2, FM mixer (Model FM10C produced by NIPPON COKE & ENGINEERING CO., LTD.) was used, and Silica particle 9 was added to the mixture of Toner particle 1 and Silica particle 1. In the state in which the water temperature in the jacket in FM mixer was stabilized at 40° C.±1° C., 1.5 parts of Silica particle 9 relative to 100 parts of Toner particle 1 was placed into the mixer. Mixing was started at the rotational speed of the rotation impeller of 3,600 rpm, and mixing was performed for 10 minutes while the water temperature and flow rate in the jacket was controlled to stabilize the temperature in the tank at 40° C.±1° C. so that a mixture of Toner particle 1, Silica particle 1, and Silica particle 9 was obtained.

Further, in Mixing step 3, FM mixer (Model FM10C produced by NIPPON COKE & ENGINEERING CO., LTD.) was used, and Silica particle 1 was added to the mixture of Toner particle 1, Silica particle 1, and Silica particle 9 obtained in Mixing step 2. In the state in which the water temperature in the jacket in FM mixer was stabilized at 25° C.±1° C., 0.75 parts of Silica particle 1 relative to 100 parts of Toner particle 1 was placed into the mixer. Mixing was started at the rotational speed of the rotation impeller of 2,000 rpm, mixing was performed for 10 minutes while the water temperature and the flow rate in the jacket were controlled to stabilize the temperature in the tank at 25° C.±1° C., and sift through a mesh having an aperture of 75 μm was performed so as to obtain Toner 1. Table 1 describes the production conditions of Toner 1, and Table 2 describes physical properties.

TABLE 1

| | Mixing step 1 | | | | | | Mixing step 2 | | |
|---|---|---|---|---|---|---|---|---|---|
| Tone No. | Silica particle No. | Amount of addition (part) | Silica particle No. | Amount of addition (part) | Rotational speed (rpm) | Time (min) | Silica particle No. | Amount of addition (part) | Silica particle No. |
| 1 | 1 | 0.75 | 9 | 0 | 400 | 2 | 1 | 0 | 9 |
| 2 | 6 | 0.75 | 9 | 0 | 400 | 2 | 6 | 0 | 9 |
| 3 | 2 | 0.75 | 9 | 0 | 400 | 2 | 2 | 0 | 9 |
| 4 | 7 | 0.75 | 9 | 0 | 400 | 2 | 7 | 0 | 9 |
| 5 | 3 | 0.50 | 9 | 0 | 400 | 2 | 3 | 0 | 9 |

TABLE 1-continued

| | | | | | | | | | |
|---|---|---|---|---|---|---|---|---|---|
| 6 | 8 | 1.50 | 9 | 0 | 400 | 2 | 8 | 0 | 9 |
| 7 | 6 | 0.55 | 9 | 0 | 400 | 2 | 6 | 0 | 9 |
| 8 | 6 | 1.75 | 9 | 0 | 400 | 2 | 6 | 0 | 9 |
| 9 | 6 | 2.40 | 9 | 0 | 400 | 2 | 6 | 0 | 9 |
| 10 | 6 | 1.50 | 9 | 0 | 400 | 2 | 6 | 0 | 9 |
| 11 | 6 | 1.50 | 9 | 0 | 400 | 2 | 6 | 0 | 9 |
| 12 | 6 | 1.50 | 9 | 0 | 400 | 2 | 6 | 0 | 9 |
| 13 | 6 | 0.75 | 9 | 0 | 400 | 2 | 6 | 0 | 9 |
| 14 | 6 | 0.75 | 10 | 0 | 400 | 2 | 6 | 0 | 10 |
| 15 | 6 | 0.75 | 9 | 0 | 400 | 2 | 6 | 0 | 9 |
| 16 | 6 | 0.75 | 10 | 0 | 400 | 2 | 6 | 0 | 10 |
| 17 | 6 | 0.35 | 9 | 0 | 400 | 2 | 6 | 0 | 9 |
| 18 | 6 | 1.50 | 9 | 0 | 400 | 2 | 6 | 0 | 9 |
| 19 | 4 | 0.75 | 9 | 0 | 400 | 2 | 4 | 0 | 9 |
| 20 | 5 | 0.75 | 9 | 0 | 400 | 2 | 5 | 0 | 9 |

| | Mixing step 2 | | | Mixing step 3 | | | | | |
|---|---|---|---|---|---|---|---|---|---|
| Tone No. | Amount of addition (part) | Rotational speed (rpm) | Time (min) | Silica particle No. | Amount of addition (part) | Silica particle No. | Amount of addition (part) | Rotational speed (rpm) | Time (min) |
| 1 | 1.5 | 3600 | 10 | 1 | 0.75 | 9 | 0 | 2000 | 10 |
| 2 | 1.5 | 3600 | 10 | 6 | 0.75 | 9 | 0 | 2000 | 10 |
| 3 | 1.5 | 3600 | 10 | 2 | 0.75 | 9 | 0 | 2000 | 10 |
| 4 | 1.5 | 3600 | 10 | 7 | 0.75 | 9 | 0 | 2000 | 10 |
| 5 | 1.5 | 3600 | 10 | 3 | 0.50 | 9 | 0 | 2000 | 10 |
| 6 | 1.5 | 3600 | 10 | 8 | 1.50 | 9 | 0 | 2000 | 10 |
| 7 | 1.5 | 3600 | 10 | 6 | 0.55 | 9 | 0 | 2000 | 10 |
| 8 | 1.5 | 3600 | 10 | 6 | 1.75 | 9 | 0 | 2000 | 10 |
| 9 | 1.5 | 3600 | 10 | 6 | 2.40 | 9 | 0 | 2000 | 10 |
| 10 | 1.5 | 3600 | 15 | — | — | — | — | — | — |
| 11 | 1.5 | 1600 | 20 | — | — | — | — | — | — |
| 12 | 1.5 | 1600 | 20 | — | — | — | — | — | — |
| 13 | 1.0 | 3600 | 10 | 6 | 0.75 | 9 | 0 | 2000 | 10 |
| 14 | 2.0 | 3600 | 10 | 6 | 0.75 | 10 | 0 | 2000 | 10 |
| 15 | 0.7 | 3600 | 10 | 6 | 0.75 | 9 | 0 | 2000 | 10 |
| 16 | 2.0 | 3600 | 10 | 6 | 0.75 | 10 | 0 | 2000 | 10 |
| 17 | 1.5 | 3600 | 10 | 6 | 0.35 | 9 | 0 | 2000 | 10 |
| 18 | 1.5 | 3600 | 10 | — | — | — | — | — | — |
| 19 | 1.5 | 3600 | 10 | 4 | 0.75 | 9 | 0 | 2000 | 10 |
| 20 | 1.5 | 3600 | 10 | 5 | 0.75 | 9 | 0 | 2000 | 10 |

TABLE 2

| Toner No. | Silica particle No. | Average major diameter (nm) | Silica particle No. | Average major diameter (nm) | External additive A coverage (%) | External additive B coverage (%) | External additive A dispersion degree evaluation index | Adhesion percentage (%) | Toner volume average particle diameter (μm) |
|---|---|---|---|---|---|---|---|---|---|
| 1 | 1 | 100 | 9 | 10 | 10.0 | 70 | 0.8 | 85 | 6.8 |
| 2 | 6 | 200 | 9 | 10 | 6.0 | 70 | 0.8 | 85 | 6.8 |
| 3 | 2 | 80 | 9 | 10 | 13.5 | 78 | 0.7 | 86 | 6.8 |
| 4 | 7 | 300 | 9 | 10 | 5.0 | 68 | 1.2 | 78 | 6.8 |
| 5 | 3 | 45 | 9 | 10 | 27.0 | 80 | 0.7 | 88 | 6.8 |
| 6 | 8 | 380 | 9 | 10 | 8.5 | 65 | 1.8 | 75 | 6.8 |
| 7 | 6 | 200 | 9 | 10 | 3.5 | 63 | 0.7 | 90 | 6.8 |
| 8 | 6 | 200 | 9 | 10 | 18.0 | 92 | 1.2 | 70 | 6.8 |
| 9 | 6 | 200 | 9 | 10 | 25.0 | 95 | 1.8 | 72 | 6.8 |
| 10 | 6 | 200 | 9 | 10 | 5.8 | 70 | 1.9 | 88 | 6.8 |
| 11 | 6 | 200 | 9 | 10 | 6.2 | 72 | 0.5 | 85 | 6.8 |
| 12 | 6 | 200 | 9 | 10 | 6.3 | 71 | 0.4 | 86 | 6.8 |
| 13 | 6 | 200 | 9 | 10 | 6.0 | 63 | 0.8 | 90 | 6.8 |
| 14 | 6 | 200 | 10 | 20 | 6.1 | 98 | 0.8 | 72 | 6.8 |
| 15 | 6 | 200 | 9 | 10 | 6.2 | 58 | 0.7 | 85 | 6.8 |
| 16 | 6 | 200 | 10 | 20 | 5.9 | 80 | 0.7 | 65 | 6.8 |
| 17 | 6 | 200 | 9 | 10 | 2.8 | 70 | 0.7 | 85 | 6.8 |
| 18 | 6 | 200 | 9 | 10 | 5.6 | 70 | 2.1 | 80 | 6.8 |

Production Example of Developing Roller 1

Production of Conductive Elastic Layer Roller
Production of Conductive Elastic Layer Roller 1

A SUS304 mandrel that had an outer diameter of 6 mm and a length of 260 mm and that was coated with a primer (trade name: DY35-051 produced by Dow Corning Toray Co., Ltd.) and subjected to baking was prepared as a substrate. The resulting substrate was placed in a die, and an addition-type silicone rubber composition in which materials described in Table 3 were mixed was injected into a cavity formed in the die. Subsequently, the die was heated so that the addition-type silicone rubber composition was cured by being heated at a temperature of 150° C. for 15 minutes and was released from the die. Thereafter, a curing reaction was completed by further heating at a temperature of 180° C. for 1 hour so as to produce Conductive elastic layer roller 1 including a conductive elastic layer having a thickness of 2.00 mm on the outer circumference of the substrate.

TABLE 3

| Material | Part by mass |
|---|---|
| Liquid silicone rubber material (trade name: SE6724A/B, produced by Dow Corning Toray Co., Ltd.) | 100 |
| Carbon black (trade name: TOKABLACK#7360SB, TOKAI CARBON CO., LTD.) | 20 |
| Platinum catalyst | 0.1 |

Preparation of Surface Layer Coating Liquid
Production of Isocyanate-Terminated Prepolymer B-1

In a nitrogen atmosphere, 100 parts by mass of polyether polyol (trade name: PTG-L3500 produced by Hodogaya Chemical Co., Ltd.) was gradually dripped to 25 parts by mass of polymeric MDI (trade name: MILLIONATE MR200 produced by NIPPON POLYURETHANE INDUSTRY CO., LTD.) in a reaction container. At this time, the temperature in the reaction container was maintained at 65° C. After dripping was completed, a reaction was performed at 65° C. for 2 hours. The resulting reaction mixture was cooled to room temperature so as to obtain Isocyanate-terminated prepolymer B-1 having an isocyanate group content of 4.3% by mass.

Preparation of Surface Layer Coating Liquid

Next, raw materials were mixed in the ratio described in Table 4 below.

TABLE 4

| Material | Part by mass |
|---|---|
| Isocyanate-terminated prepolymer B-1 | 58 |
| Polyether polyol A-1 (trade name: PTMG2000, produced by Mitsubishi Chemical Corporation) | 42 |
| Carbon black C-1 (trade name: MA100, produced by Mitsubishi Chemical Corporation) | 25 |
| First resin particle D-1 (trade name: CE400 clear, polyurethane particle, produced by Negami chemical industrial co., ltd.) | 33 |
| Second resin particle E-1 (trade name: C800 clear, polyurethane particle, produced by Negami chemical industrial co., ltd.) | 77 |

Subsequently, Liquid mixture 1 was obtained by adding methyl ethyl ketone (MEK) so that the solid content in the above-described raw material became 30% by mass. In addition, 1,250 parts by mass of the liquid mixture and 200 parts by mass of glass beads having an average particle diameter of 0.8 mm were placed into a glass bottle having an internal volume of 450 mL and were dispersed for 3 hours by using PAINT SHAKER (produced by Toyo Seiki Seisaku-sho, Ltd.). Thereafter, glass beads were removed so as to obtain a surface-layer-forming coating liquid.

Production of Developing Roller

Conductive elastic layer roller 1 was dipped once into the coating liquid and air-dried at 23° C. for 30 minutes. Subsequently, drying was performed for 1 hour in a hot-air circulation dryer set at 160° C. so as to produce Developing roller 1 in which a surface layer is formed on the outer circumferential surface of the conductive elastic roller. In this regard, the immersion time during dip coating was 9 sec. The pull-up time during dip coating was adjusted so that the initial speed was set to be 20 mm/s, the final speed was set to be 2 mm/s, and the speed between 20 mm/s and 2 mm/s was linearly changed with respect to the time.

Image Evaluation

Regarding an image forming apparatus, a modified machine and a modified cartridge of a tandem system laser beam printer HP Color Laser Jet Enterprise CP4525dn (produced by Hewlett-Packard Company) having the configuration illustrated in FIG. 1 were used. In FIG. 1, reference 11 denotes a photosensitive member, reference 12 denotes a developing roller, reference 13 denotes a toner supplying roller, reference 14 denotes a toner, reference 15 denotes a regulating member, reference 16 denotes a developing device, reference 17 denotes laser light, reference 18 denotes a charge device, reference 19 denotes a cleaning device, reference 20 denotes a cleaning charge device, reference 21 denotes an agitation impeller, reference 22 denotes a driving roller, reference 23 denotes a transfer roller, reference 24 denotes a bias power supply, reference 25 denotes a tension roller, reference 26 denotes a transfer conveying belt, reference 27 denotes a driven roller, reference 28 denotes paper, reference 29 denotes a feeding roller, reference 30 denotes an attracting roller, and reference 31 denotes a fixing device.

This modified machine was modified so as to set the process speed to be 320 mm/s by changing an internal gear. In addition, a product toner was removed from the interior of a cartridge, cleaning was performed by air blow, a developing roller was switched to Developing roller 1 produced, and 250 g of Toner 1 was introduced. The resulting toner cartridge was left to stand for 24 hours in an environment at a temperature of 30° C. and a humidity of 80% RH and was incorporated into a black station of the printer. Dummy cartridges were incorporated into the other stations, and an image output test was performed.

Regarding the image evaluation, 25,000 sheets of images were output while an operation in which two sheets of images having a printing ratio of 1% were printed and thereafter printing was suspended for 1 minute was repeated, the machine was left to stand for 14 days in an environment at a temperature of 30° C. and a humidity of 80% RH, and thereafter horizontal streak evaluation described below was performed.

After the evaluation, 50,000 sheets of images were further output while an operation in which two sheets of images having a printing ratio of 1% were printed and thereafter printing was suspended for 1 minute was repeated, the machine was left to stand for 14 days in an environment at a temperature of 30° C. and a humidity of 80% RH, and thereafter horizontal streak evaluation described below was performed.

Horizontal Streak Evaluation after Standing for 14 Days in Environment at Temperature of 30° C. and Humidity of 80% RH After 25,000 sheets or 50,000 sheets of images were output, the machine was left to stand for 14 days in an environment at a temperature of 30° C. and a humidity of 80% RH, and a half tone image was output so as to evaluate a state of occurrence of a horizontal white streak-like image and a horizontal black streak-like image. The evaluation criteria are as described below.

A: No horizontal streak-like defects are observed.

B: Horizontal streak-like defects are hardly observed.

C: Occurrences of horizontal streak-like defects in accordance with the rotational pitch of the developing roller are observed in some regions, but there is no problem in practice.

D: Horizontal streak-like defects are observed in wide regions and are conspicuous.

Production Examples of Toner 2 to 20

Toner 2 to 20 were produced in the same manner as in the production example of Toner 1 except that production conditions and formulation described in Table 1 were adopted. Table 2 describes the physical properties of Toner 2 to 18. The method for producing each raw material will be described below.

Regarding Toner 19, it was ascertained that there was no external additive having a major diameter of 40 nm or more and 400 nm or less. The physical properties of Toner 19 obtained are described in Table 5.

Likewise, regarding Toner 20, it was ascertained that there was no external additive having a major diameter of 40 nm or more and 400 nm or less. The physical properties of Toner 20 obtained are described in Table 6.

Production Examples of Silica Particle 2 to 4

Silica particle 2 to 4 were obtained as described below. The amount of methanol used at the start in the production example of Silica particle 1 was changed to 634.0 g, 842.1 g, and 883.5 g, respectively. The dripping time of tetramethoxysilane was changed to 7 hours, 6 hours, and 5 hours, respectively, and the dripping time of 5.4%-by-mass ammonia water was changed to 6 hours, 5 hours, and 4 hours, respectively. The major diameter of the silica particle was adjusted by such an operation. In addition, when the surface treatment with HMDS to make the amount of carbon to become equal to the amount in Silica particle 1 was performed, the amounts of HMDS and water were adjusted.

Production Example of Silica Particle 5

Silica particle 5 was obtained as described below. The amount of methanol used at the start in the production example of Silica particle 1 was changed to 382.7 g. The amount of 28%-by-mass ammonia water was changed to 37.1 g. The dripping time of tetramethoxysilane was changed to 7 hours, and the dripping time of 5.4%-by-mass ammonia water was changed to 6 hours. The major diameter of the silica particle was adjusted by such an operation. In addition, when the surface treatment with HMDS to make the amount of carbon to become equal to the amount in Silica particle 1 was performed, the amounts of HMDS and water were adjusted.

Production Example of Silica Particle 6

Silica particle 6 was obtained as described below. The amount of methanol used at the start in the production example of Silica particle 1 was changed to 491.3 g. The dripping time of tetramethoxysilane was changed to 7 hours, and the dripping time of 5.4%-by-mass ammonia water was changed to 6 hours. The major diameter of the silica particle was adjusted by such an operation. In addition, when the surface treatment with HMDS to make the amount of carbon to become equal to the amount in Silica particle 1 was performed, the amounts of HMDS and water were adjusted.

Production Examples of Silica Particle 7 and 8

Silica particle 7 and 8 were obtained as described below. The amount of methanol used at the start in the production example of Silica particle 1 was changed to 405.5 g and 385.5 g, respectively. The dripping time of tetramethoxysilane was changed to 7 hours, and the dripping time of 5.4%-by-mass ammonia water was changed to 6 hours. The major diameter of the silica particle was adjusted by such an operation. In addition, when the surface treatment with HMDS to make the amount of carbon to become equal to the amount in Silica particle 1 was performed, the amounts of HMDS and water were adjusted.

Production Example of Silica Particle 10

Hydrophobic treatment was performed by using 15 parts of hexamethyldisilazane (HMDS) and 15 parts of dimethylsilicone oil relative to 100 parts of dry silica fine powder (BET specific surface area of 90 $m^2/g$).

TABLE 5

| Toner No. | Silica particle No. | Silica particle 4 average major diameter (nm) | Silica particle No. | Silica particle 9 average major diameter (nm) | Silica particle 4 coverage (%) | Silica particle 9 coverage (%) | Silica particle 4 dispersion degree evaluation index | Fixing percentage (%) | Toner volume average particle diameter (μm) |
|---|---|---|---|---|---|---|---|---|---|
| 19 | 4 | 35 | 9 | 10 | 35.0 | 80 | 1.5 | 85 | 6.8 |

TABLE 6

| Toner No. | Silica particle No. | Silica particle 5 average major diameter (nm) | Silica particle No. | Silica particle 9 average major diameter (nm) | Silica particle 5 coverage (%) | Silica particle 9 coverage (%) | Silica particle 5 dispersion degree evaluation index | Fixing percentage (%) | Toner volume average particle diameter (μm) |
|---|---|---|---|---|---|---|---|---|---|
| 20 | 5 | 500 | 9 | 10 | 2.5 | 68 | 2.3 | 65 | 6.8 |

Production Examples of Developing Roller 2 to 18

Developing roller 2 to 18 were produced in the same manner as for Developing roller 1 except that the conductive elastic layer roller and the composition of the surface layer coating liquid were set to be as described in Table 7. Herein, the raw materials described in Table 7 are illustrated in Table 8, and the method for producing each raw material will be described below. The physical properties of Developing roller 2 to 16 are described in Table 9.

Regarding Developing roller 17, it was ascertained that there was no resin particle having an elastic coefficient of 100 MPa or more and 10,000 MPa or less as a result of the elastic coefficient measurement of resin particle of the rubber slice in the thickness direction of the surface layer. The physical properties of Developing roller 17 are described in Table 10.

Regarding Developing roller 18, it was ascertained that there was no resin particle having an elastic coefficient of 2 MPa or more and 50 MPa or less as a result of the elastic coefficient measurement of resin particle of the rubber slice in the thickness direction of the surface layer. The physical properties of Developing roller 18 are described in Table 11.

TABLE 7

| Developing | Polyol | | Isocyanate | | Conducting agent | | First resin particle | | Second resin particle | |
|---|---|---|---|---|---|---|---|---|---|---|
| roller No. | Type | Part by mass | Type | Part by mass | Type | Part by mass | Type | Part by mass | Type | Part by mass |
| 1 | A-1 | 42 | B-1 | 58 | C-1 | 25 | D-1 | 33 | E-1 | 77 |
| 2 | A-1 | 42 | B-1 | 58 | C-1 | 25 | D-4 | 18 | E-3 | 55 |
| 3 | A-1 | 42 | B-1 | 58 | C-1 | 25 | D-3 | 55 | E-3 | 110 |
| 4 | A-3 | 6 | B-1 | 94 | C-1 | 25 | D-6 | 33 | E-1 | 77 |
| 5 | A-1 | 42 | B-1 | 58 | C-1 | 25 | D-2 | 13 | E-5 | 41 |
| 6 | A-2 | 42 | B-2 | 58 | C-1 | 25 | D-2 | 13 | E-6 | 41 |
| 7 | A-1 | 42 | B-1 | 58 | C-1 | 25 | D-2 | 7 | E-3 | 117 |
| 8 | A-3 | 6 | B-1 | 94 | C-1 | 25 | D-7 | 33 | E-1 | 77 |
| 9 | A-1 | 42 | B-1 | 58 | C-1 | 25 | D-2 | 4 | E-2 | 20 |
| 10 | A-1 | 42 | B-1 | 58 | C-1 | 25 | D-3 | 46 | E-2 | 28 |
| 11 | A-1 | 42 | B-1 | 58 | C-1 | 25 | D-3 | 110 | E-3 | 220 |
| 12 | A-3 | 6 | B-1 | 94 | C-1 | 25 | D-2 | 4 | E-7 | 29 |
| 13 | A-3 | 6 | B-1 | 94 | C-1 | 25 | D-2 | 8 | E-9 | 144 |
| 14 | A-3 | 6 | B-1 | 94 | C-1 | 25 | D-8 | 33 | E-4 | 77 |
| 15 | A-3 | 6 | B-1 | 94 | C-1 | 25 | D-5 | 4 | E-8 | 20 |
| 16 | A-3 | 6 | B-1 | 94 | C-1 | 25 | D-9 | 1 | E-1 | 20 |
| 17 | A-3 | 6 | B-1 | 94 | C-1 | 25 | D-10 | 60 | E-1 | 30 |
| 18 | A-3 | 6 | B-1 | 94 | C-1 | 25 | D-2 | 3 | — | — |

TABLE 8

| | | |
|---|---|---|
| Polyol | A-1 | polyether polyol<br>(hydroxyl value: 56.1 mgKOH/g, trade name: PTMG2000, produced by Mitsubishi Chemical Corporation) |
| | A-2 | polycarbonate polyol<br>(hydroxyl value: 55.7 mgKOH/g, trade name: DURANOL T5652, produced by Asahi Kasei Corporation) |
| | A-3 | amine-based polyol<br>(hydroxyl value: 701 mgKOH/g, trade name: NP-400, produced by Sanyo Chemical Industries, Ltd.) |
| Isocyanate | B-1 | polyether polyol<br>(NCO content: 4.3%, trade name: PTG-L3500, produced by Hodogaya Chemical Co., Ltd.)/<br>polymeric MDI (trade name: MILLIONATE MR200, produced by Tosoh Corporation) |
| | B-2 | polycarbonate polyol<br>(NCO content: 4.3%, trade name: DURANOL T5652, produced by Asahi Kasei Corporation)/<br>polymeric MDI (trade name: MILLIONATE MR200, produced by Tosoh Corporation) |
| Conducting agent | C-1 | carbon black<br>(trade name: MA100, average primary particle diameter 24 nm, produced by Mitsubishi Chemical Corporation) |
| First resin particle | D-1 | urethane particle<br>(trade name: ART PEARL CE400 clear, average particle diameter 15.0 μm, produced by Negami chemical industrial co., ltd.) |
| | D-2 | urethane particle<br>(A-3 × B-1, average particle diameter 13.0 μm) |
| | D-3 | urethane particle<br>(A-3 × B-1, average particle diameter 20.0 μm) |

TABLE 8-continued

| | | |
|---|---|---|
| | D-4 | urethane particle (trade name: ART PEARL U600 clear, average particle diameter 10.0 μm, produced by Negami chemical industrial co., ltd.) |
| | D-5 | urethane particle (classified product) (trade name: ART PEARL CE400 clear, average particle diameter 13.0 μm, produced by Negami chemical industrial co., ltd.) |
| | D-6 | acrylic particle (trade name: Chemisnow MX-1500H, average particle diameter 15.0 μm, produced by Soken Chemical and Engineering Co., Ltd.) |
| | D-7 | acrylic particle (trade name: Techpolymer AFX-15, average particle diameter 15.0 μm, produced by Sekisui Chemical Co., Ltd.) |
| | D-8 | urethane particle (trade name: ART PEARL C400 clear, average particle diameter 15.0 μm, produced by Negami chemical industrial co., ltd.) |
| | D-9 | urethane particle (A-1 × B-2, average particle diameter 8.0 μm) |
| | D-10 | urethane particle (A-1 × B-2, average particle diameter 20.0 μm) |
| Second resin particle | E-1 | urethane particle (trade name: ART PEARL C800 clear, average particle diameter 6.0 μm, produced bv Negami chemical industrial co., ltd.) |
| | E-2 | urethane particle (classified product) (trade name: ART PEARL C800 clear, average particle diameter 8.0 μm, produced by Negami chemical industrial co., ltd.) |
| | E-3 | urethane particle (trade name: ART PEARL C1000 clear, average particle diameter 3.0 μm, produced by Negami chemical industrial co., ltd.) |
| | E-4 | silicone particle (trade name: KMP-600, average particle diameter 5.0 μm, produced by Shin-Etsu Chemical Co., Ltd.) |
| | E-5 | urethane particle (trade name: ART PEARL JB800 clear, average particle diameter 6.0 μm produced by Negami chemical industrial co., ltd.) |
| | E-6 | urethane particle (A-2 × B-2, average particle diameter 8.0 μm) |
| | E-7 | urethane particle (A-2 × B-2, average particle diameter 10.0 μm) |
| | E-8 | acrylic particle (trade name: Chemisnow MX-500H, average particle diameter 5.0 μm, produced by Soken Chemical and Engineering Co., Ltd.) |
| | E-9 | silicone particle (trade name: KMP-605, average particle diameter 2.0 μm, produced by Shin-Etsu Chemical Co., Ltd.) |

Preparation of Surface Layer Coating Liquid

Production of Isocyanate-Terminated Prepolymer B-2

In a nitrogen atmosphere, 100 parts by mass of polycarbonate polyol (trade name: DURANOL T5652 produced by Asahi Kasei Corporation) was gradually dripped to 33 parts by mass of polymeric MDT (trade name: MILLIONATE MR200 produced by NIPPON POLYURETHANE INDUSTRY CO., LTD.) in a reaction container. At this time, the temperature in the reaction container was maintained at 65° C. After dripping was completed, a reaction was performed at 65° C. for 2 hours. The resulting reaction mixture was cooled to room temperature so as to obtain Isocyanate-terminated prepolymer B-2 having an isocyanate group content of 4.3% by mass.

Production of Urethane Particle D-2

A suspension was formed by adding 3 parts by mass of Amine-based polyol A-3 and 97 parts by mass of Isocyanate-terminated prepolymer B-1 to water containing suspension stabilizer (calcium phosphate) and performing agitation. Subsequently, the suspension was heated to initiate a reaction, and the reaction was sufficiently performed so as to generate urethane particle. Thereafter, the urethane particle was recovered through solid-liquid separation, the suspension stabilizer was removed through washing, and drying was performed. The resulting urethane particle was classified by using an air classifier (trade name: Model EJ-L-3 produced by Nittetsu Mining Co., Ltd.). The result of measuring the volume average particle diameter (median diameter) of the urethane particle by using a particle size distribution analyzer (trade name: Coulter Multisizer II produced by Beckman Coulter, Inc.) was 13.0 μm. This was taken as Urethane particle D-2.

Production of Urethane Particle D-3, D-9, and D-10

Urethane particle D-3 (volume average particle diameter of 20.0 μm), Urethane particle D-9 (volume average particle diameter of 8.0 μm), and Urethane particle D-10 (volume average particle diameter of 30.0 μm) were produced in the same manner as in the production of Urethane particle D-2 except that the agitation speed of the suspension and the classification conditions for the urethane particle were changed.

Production of Urethane Particle D-5

Urethane particle ART PEARL U400 clear (trade name, average particle diameter 15.1 μm, produced by Negami chemical industrial co., ltd.) was classified by using an air classifier (trade name: Model EJ-L-3 produced by Nittetsu Mining Co., Ltd.). The result of measuring the volume average particle diameter (median diameter) of the urethane particle by using a particle size distribution analyzer (trade name: Coulter Multisizer II produced by Beckman Coulter, Inc.) was 13.0 μm. This was taken as Urethane particle D-5.

Production of Urethane Particle E-6 and E-7

Urethane particle E-6 (volume average particle diameter of 8.0 μm) and Urethane particle E-7 (volume average particle diameter of 8.0 μm) were produced in the same manner as in the production of Urethane particle D-2 except that polyol was changed to 35 parts by mass of Polycarbonate-based polyol A-2, isocyanate was changed to 65 parts by mass of Isocyanate-terminated prepolymer B-2, and the agitation speed of the suspension and the classification conditions for the urethane particle were changed.

TABLE 9

| Developing roller No. | Binder resin elastic coefficient Eb (MPa) | First resin particle Elastic coefficient E1 (MPa) | D1 (μm) | V1 | Second resin particle Elastic coefficient E2 (MPa) | D2 (μm) | V2 | Rz average value (μm) | Spd (1/mm$^2$) |
|---|---|---|---|---|---|---|---|---|---|
| 1 | 21 | 1000 | 14.9 | 15 | 31 | 6.0 | 35 | 10.1 | $2.0 \times 10^4$ |
| 2 | 20 | 2000 | 10 | 10 | 32 | 3.0 | 30 | 7.5 | $2.7 \times 10^4$ |
| 3 | 21 | 104 | 19.8 | 20 | 33 | 3.0 | 40 | 16.7 | $3.5 \times 10^4$ |
| 4 | 92 | 7419 | 14.9 | 15 | 33 | 5.9 | 35 | 10.1 | $2.2 \times 10^4$ |
| 5 | 21 | 107 | 12.9 | 8 | 3 | 6.0 | 25 | 8.0 | $1.2 \times 10^4$ |
| 6 | 51 | 109 | 13 | 8 | 50 | 7.9 | 25 | 8.2 | $9.3 \times 10^3$ |
| 7 | 22 | 106 | 13 | 3 | 31 | 3.0 | 50 | 6.1 | $4.9 \times 10^4$ |
| 8 | 99 | 806 | 15 | 15 | 31 | 6.0 | 35 | 10.1 | $1.9 \times 10^4$ |
| 9 | 22 | 100 | 12.9 | 3 | 30 | 7.9 | 15 | 6.0 | $5.0 \times 10^3$ |
| 10 | 21 | 106 | 20 | 25 | 30 | 8.0 | 15 | 17.0 | $5.1 \times 10^3$ |
| 11 | 21 | 101 | 19.9 | 25 | 33 | 3.0 | 50 | 18.0 | $5.0 \times 10^4$ |
| 12 | 109 | 104 | 13 | 3 | 50 | 10.0 | 20 | 6.0 | $6.5 \times 10^3$ |
| 13 | 99 | 108 | 12.9 | 3 | 2 | 2.0 | 55 | 6.1 | $6.2 \times 10^4$ |
| 14 | 93 | 100 | 8 | 1 | 33 | 6.0 | 15 | 3.9 | $8.7 \times 10^3$ |
| 15 | 95 | 103 | 30 | 30 | 32 | 6.0 | 15 | 30.2 | $8.5 \times 10^3$ |
| 16 | 93 | 104 | 13 | 3 | — | — | — | 7.0 | $5.2 \times 10^2$ |

TABLE 10

| Developing roller No. | Binder resin elastic coefficient Eb (MPa) | Resin particle (1) Elastic coefficient (MPa) | D1 (μm) | VI | Resin particle (2) Elastic coefficient (MPa) | D2 (μm) | V2 | Rz average value (μm) | Spd (1/mm$^2$) |
|---|---|---|---|---|---|---|---|---|---|
| 17 | 93 | 32 | 15 | 15 | 2 | 5.1 | 35 | 10.5 | $2.0 \times 10^4$ |

TABLE 11

| Developing roller No. | Binder resin elastic coefficient Eb (MPa) | Resin particle (1) Elastic coefficient (MPa) | D1 (μm) | V1 | Resin particle (2) Elastic coefficient (MPa) | D2 (μm) | V2 | Rz average value (μm) | Spd (1/mm$^2$) |
|---|---|---|---|---|---|---|---|---|---|
| 18 | 97 | 2000 | 12.9 | 3 | 5335 | 5.0 | 15 | 5.9 | $7.1 \times 10^3$ |

Examples 2 to 25 and Comparative Examples 1 to 10

The image evaluation akin to example 1 was performed by using Toner 1 to 21 and Developing roller 1 to 18 in the combination described in Table 8. The evaluation results are described in Table 12.

TABLE 12

| | Toner No. | Roller No. | Formula (a) | Formula (b) | Horizontal white streak 25000 sheets | Horizontal white streak 50000 sheets | Horizontal black streak 25000 sheets | Horizontal black streak 50000 sheets |
|---|---|---|---|---|---|---|---|---|
| Example 1 | 1 | 1 | 2.1 | 60 | C | C | A | A |
| Example 2 | 2 | 1 | 2.1 | 30 | A | A | A | A |
| Example 3 | 3 | 2 | 0.2 | 38 | A | A | A | A |
| Example 4 | 4 | 1 | 2.1 | 20 | A | A | A | A |
| Example 5 | 5 | 2 | 0.2 | 67 | C | C | A | A |
| Example 6 | 6 | 1 | 2.1 | 16 | C | C | A | A |
| Example 7 | 7 | 1 | 2.1 | 30 | B | B | A | A |
| Example 8 | 8 | 1 | 2.1 | 30 | A | A | A | A |
| Example 9 | 9 | 1 | 2.1 | 30 | C | C | A | A |

TABLE 12-continued

| | Toner No. | Roller No. | Formula (a) | Formula (b) | Horizontal white streak 25000 sheets | Horizontal white streak 50000 sheets | Horizontal black streak 25000 sheets | Horizontal black streak 50000 sheets |
|---|---|---|---|---|---|---|---|---|
| Example 10 | 10 | 1 | 2.1 | 30 | C | C | A | A |
| Example 11 | 11 | 1 | 2.1 | 30 | A | A | B | B |
| Example 12 | 12 | 1 | 2.1 | 30 | A | A | C | C |
| Example 13 | 13 | 1 | 2.1 | 30 | A | B | A | A |
| Example 14 | 14 | 1 | 2.1 | 30 | A | B | A | A |
| Example 15 | 2 | 2 | 0.2 | 15 | A | A | A | A |
| Example 16 | 2 | 3 | 10 | 15 | A | B | A | A |
| Example 17 | 2 | 4 | 2.2 | 30 | B | C | A | A |
| Example 18 | 2 | 5 | 0.1 | 30 | B | B | A | A |
| Example 19 | 2 | 6 | −1.7 | 40 | C | C | A | A |
| Example 20 | 2 | 7 | 3.2 | 15 | B | B | A | A |
| Example 21 | 15 | 1 | 2.1 | 30 | C | C | A | A |
| Example 22 | 16 | 1 | 2.1 | 30 | C | C | A | A |
| Example 23 | 2 | 8 | 2.2 | 30 | B | C | A | A |
| Example 24 | 2 | 9 | −1.8 | 40 | C | C | A | A |
| Example 25 | 2 | 10 | 5.2 | 40 | B | C | A | A |
| Example 26 | 2 | 11 | 10.1 | 15 | B | C | A | A |
| Example 27 | 2 | 12 | −3.8 | 50 | C | C | A | A |
| Example 28 | 2 | 13 | 4.1 | 10 | C | C | A | A |
| Comparative example 1 | 2 | 17 | 3.1 | 26 | D | D | A | A |
| Comparative example 2 | 2 | 18 | 1.1 | 25 | D | D | A | A |
| Comparative example 3 | 2 | 14 | −4.8 | 30 | D | D | A | A |
| Comparative example 4 | 2 | 15 | 17.2 | 30 | C | D | A | A |
| Comparative example 5 | 19 | 4 | 2.2 | — | D | D | A | A |
| Comparative example 6 | 20 | 4 | 2.2 | — | C | D | A | A |
| Comparative example 7 | 17 | 4 | 2.2 | 30 | D | D | A | A |
| Comparative example 8 | 18 | 4 | 2.2 | 30 | D | D | A | A |
| Comparative example 9 | 2 | 16 | — | — | D | D | A | A |

According to the present disclosure, a process cartridge capable of producing a high quality image even when a speed is increased, even when an operating life is increased, and even after being left to stand for a long time during use of the process cartridge in a high temperature, high-humidity environment is provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-162165, filed Sep. 28, 2020, which is hereby incorporated by reference herein in its entirety.

What is claimed is:

1. A process cartridge attachable to and detachable from an electrophotographic apparatus main body, the process cartridge comprising:
- a toner;
- a developing roller; and
- a regulating member,
- wherein the developing roller comprises:
  - a conductive substrate,
  - an elastic layer on the conductive substrate, and
  - a surface layer on the elastic layer,
- the surface layer comprises:
  - a binder resin,
  - a first resin particle, and
  - a second resin particle,
- the surface layer has an outer surface having:
  - a first protruded portion, and
  - a second protruded portion that is present in a region not including the first protruded portion and that has a height 5.0 μm or more smaller than the height of the first protruded portion,
- the first protruded portion is derived from the first resin particle,
- the second protruded portion is derived from the second resin particle,
- the first resin particle has an elastic coefficient of 100 MPa or more and 10,000 MPa or less, the elastic coefficient of the first resin particle being measured at the cross section of the surface layer in the thickness direction,
- the second resin particle has an elastic coefficient of 2 MPa or more and 50 MPa or less, the elastic coefficient of the second resin particle being measured at the cross section of the surface layer in the thickness direction,
- the outer surface has an average value of the maximum height Rz of 6 μm or more and 18 μm or less,
- the toner comprises:
  - a toner particle, and
  - an external additive A dispersed on a surface of the toner particle and covering the surface of the toner particle, the external additive A is a silica particle having a major diameter of 40 nm or more and 400 nm or less, a surface coverage of the toner particle by the external additive A is 3.0% or more, and a dispersion degree evaluation index D of the external additive A is 2.0 or less.

2. The process cartridge according to claim 1, wherein the dispersion degree evaluation index D of the external additive A is 0.5 or more and 1.20 or less.

3. The process cartridge according to claim 1, wherein the toner further comprises an external additive B covering the surface of the toner particle, the external additive B is a silica particle having a major diameter of 5 nm or more and less than 40 nm, and the surface coverage of the toner particle by the external additive B is 62% or more and 100% or less.

4. The process cartridge according to claim 3, wherein the external additive A and the external additive B adhere to the toner particle, and a total adhesion percentage of the external additive A and the external additive B is 70% or more.

5. The process cartridge according to claim 1, wherein a volume average diameter D1 of the first resin particle, a volume average diameter D2 of the second resin particle, and a volume average diameter Dt of the toner satisfy the relationship represented by the formula (a) below $$(D1-D2)-Dt>0 \quad \text{(a).}$$

6. The process cartridge according to claim 1, wherein the volume average diameter D2 of the second resin particle and an average major diameter Da of the external additive A satisfy the relationship represented by the formula (b) below $$D2/Da \leq 40 \quad \text{(b).}$$

* * * * *